(12) United States Patent
Tonami et al.

(10) Patent No.: US 7,516,392 B2
(45) Date of Patent: Apr. 7, 2009

(54) RECORDING APPARATUS, REPRODUCING APPARATUS AND RECORDING MEDIUM

(75) Inventors: Junichiro Tonami, Yokohama (JP); Yuuki Fujiwara, Yokosuka (JP)

(73) Assignee: Victor Comapny of Japan, Ltd., Yokohama (JP)

( * ) Notice: Subject to any disclaimer, the term of this patent is extended or adjusted under 35 U.S.C. 154(b) by 603 days.

(21) Appl. No.: 11/203,156

(22) Filed: Aug. 15, 2005

(65) Prior Publication Data

US 2006/0123328 A1    Jun. 8, 2006

(30) Foreign Application Priority Data

Nov. 10, 2004    (JP)    ............................. 2004-325868

(51) Int. Cl.
*H03M 13/00*    (2006.01)
(52) U.S. Cl. ....................................... 714/769; 714/758
(58) Field of Classification Search .................. 714/758, 714/769
See application file for complete search history.

(56) References Cited

U.S. PATENT DOCUMENTS

| 5,926,490 | A | * | 7/1999 | Reed et al. | .................... | 714/787 |
| 6,052,248 | A | * | 4/2000 | Reed et al. | ..................... | 360/53 |
| 6,079,041 | A | * | 6/2000 | Kunisa et al. | ................ | 714/752 |

FOREIGN PATENT DOCUMENTS

| JP | 200-286709 | 10/2000 |
| JP | 2001-285080 | 10/2001 |
| JP | 2003-068024 | 3/2003 |
| JP | 2003-203435 | 7/2003 |

OTHER PUBLICATIONS

IEEE Transactions on Magnetics, vol. 36, No. 5, Sep. 2000, pp. 2183-2186, Hongxin Song et al., entitled "Low Density Parity Check Codes for Magnetic Recording Channels".
Hongwei Song et al., "DE-Free (d, k) Constrained Low Density Parity check (LDPC) Codes", Technical Digest 2002 IEEE, ThA. 4, pp. 377-379.
"Constrained Coding Techniques for Soft Interactive Decoders", John L. Fan et al., Global Telecommunications Conference-Globecom '99, pp. 723-727.

* cited by examiner

*Primary Examiner*—Joseph D Torres
(74) *Attorney, Agent, or Firm*—Louis Woo

(57) ABSTRACT

A first run length encoder implements run length modulation of a first information signal to generate a second information signal of a run-length-limited code while subjecting the second information signal to DSV control and adding a sync signal to the second information signal to get a third information signal. A converter changes the third information signal into an NRZI signal including information code words. A parity generator produces original parity signals in response to the information code words in the NRZI signal, and combines the information code words and the original parity signals to form a first parity-added signal. A second run length encoder implements run length modulation of only the original parity signals in the first parity-added signal to convert the first parity-added signal into a second parity-added signal while subjecting the second parity-added signal to DSV control. The second parity-added signal is recorded on a recording medium.

3 Claims, 17 Drawing Sheets

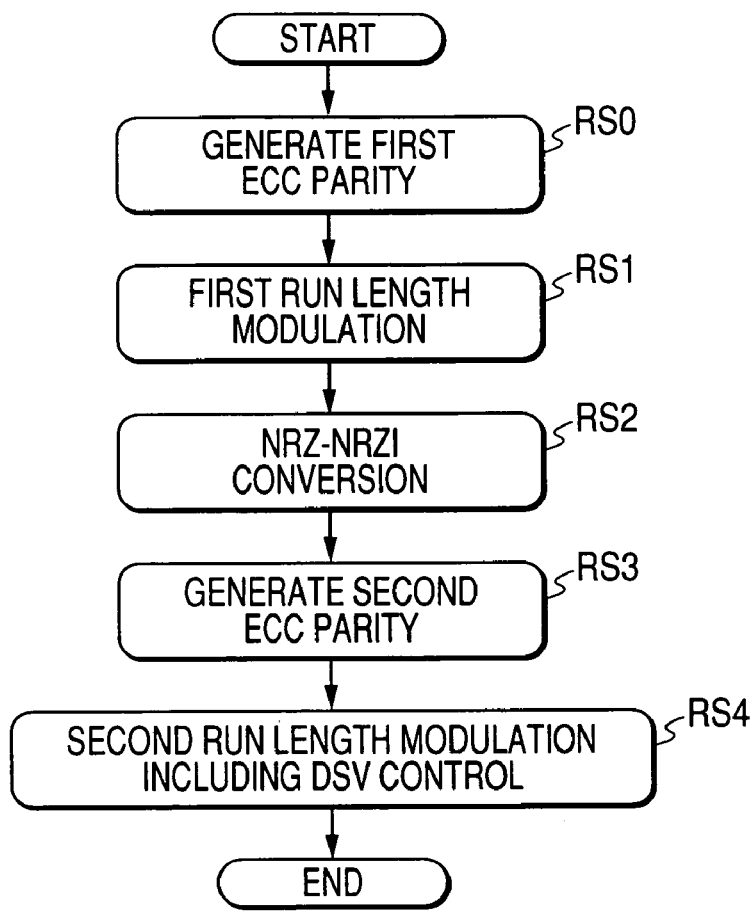
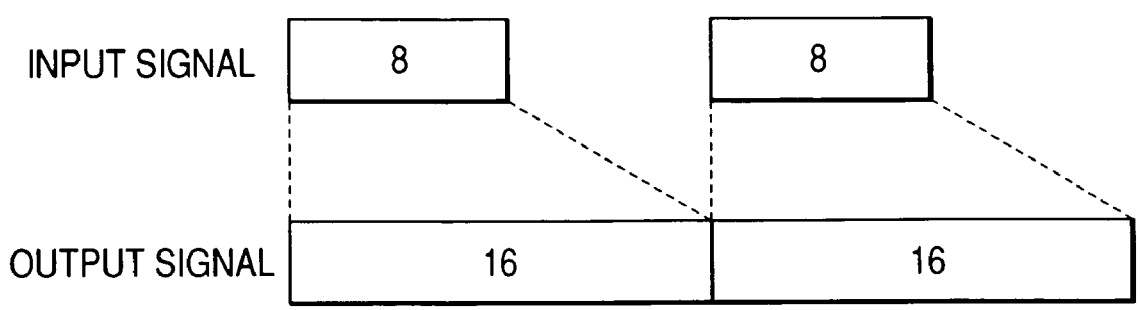

FIG. 5

| IN | s(i) = 1 | s(i+1) | s(i) = 2 | s(i+1) | s(i) = 3 | s(i+1) | s(i) = 4 | s(i+1) |
|---|---|---|---|---|---|---|---|---|
| 0 | 001000000001001 | 1 | 010000000100000 | 2 | 001000000001001 | 1 | 010000001000000 | 2 |
| 1 | 001000000000010 | 1 | 001000000010010 | 1 | 100000010010000 | 3 | 100000010010000 | 3 |
| 2 | 001000010010000 | 2 | 001000001000000 | 2 | 100000010010000 | 2 | 100000010010000 | 1 |
| 3 | 001000001001010 | 2 | 010001001000000 | 4 | 100010010000000 | 2 | 010010100000000 | 4 |
| 4 | 001000010010000 | 2 | 001000010010000 | 2 | 001000010010000 | 2 | 100000100100000 | 2 |
| 5 | 001000000100100 | 2 | 001000010010100 | 3 | 100010010000000 | 4 | 101010010000000 | 4 |
| 6 | 001000000100100 | 3 | 001000001000100 | 1 | 100100010000000 | 4 | 100100010000000 | 4 |
| 7 | 001000001001000 | 3 | 010000000010010 | 3 | 001000001001000 | 3 | 010000000000010 | 1 |
| 8 | 001000010010000 |  | 001000010010000 |  | 100000100100000 | 4 | 100000100100000 | 4 | d1 (pointing to row 7, s(i+1) column after s(i)=1): 3
d2 (pointing to row 2, s(i+1) column after s(i)=3): 1

RECORDING APPARATUS, REPRODUCING APPARATUS AND RECORDING MEDIUM

BACKGROUND OF THE INVENTION

1. Field of the Invention

This invention generally relates to a recording apparatus, a reproducing apparatus, and a recording medium. This invention particularly relates to a recording apparatus implementing modulation suited for the recording of a signal of a run-length-limited code on a recording medium such as an optical disc. In addition, this invention particularly relates to a reproducing apparatus for recovering original information code words from a signal of a run-length-limited code which is reproduced from a recording medium such as an optical disc.

Furthermore, this invention particularly relates to a recording medium for storing a signal of a run-length-limited code.

2. Description of the Related Art

Turbo codes are in a class of high-performance error correction codes, and come closest to approaching the Shannon limit, that is, the theoretical limit of maximum information transfer over a noisy channel. The turbo codes make it possible to increase an available bandwidth without increasing the power of a transmission. Signals of the turbo codes have payload data and parity bits for the payload data. The main drawback of the turbo codes is a relatively high latency.

Hongwei Song, Jingfeng Liu, and B. V. K. Vijaya Kumar have reported "DC-Free (d, k) Constrained Low Density Parity Check (LDPC) Codes", Technical Digest 2002 IEEE, ThA.4, pages 377-379. According to the report, a DC-free (1, 7) RLL LDPC code is constructed for low signal-to-noise ratio and high-density recording of data on a recording medium. Specifically, the DC-free (1, 7) RLL LDPC code is generated as follows. The user information bits are first passed through a conventional (1, 7) RLL encoder, and the resultant (1, 7) RLL coded sequence goes through a conventional LDPC encoder. Since the LDPC encoder can be easily made systematic, the information bit part of the LDPC code word satisfies (1, 7) RLL. The resultant LDPC coded sequence is encoded by an extended bit insertion encoder. The extended bit insertion encoder multiplexes the parity check bits with the information bits. Specifically, the extended bit insertion encoder groups the parity check bits into two bits per group and inserts them periodically into the information bits which already satisfy (1, 7) RLL. In more detail, the extended bit insertion encoder groups the parity check bits as two bits P1 and P2 in one group and places a control bit B between the two parity check bits P1 and P2 to make sure that they do not violate "1" run length constraint. If both of the parity check bits P1 and P2 are "0", then the control bit B is set to "1". Otherwise, the control bit B is set to "0". Furthermore, the extended bit insertion encoder generates two control bits A1 and A2 placed immediately before each parity check and control bit set "P1-B-P2", and two control bits A3 and A4 placed immediately after the bit set "P1-B-P2". The control bits A1 and A4 are used primarily to ensure that (1, 7) RLL will not be violated. The control bits A2 and A3 are used to control the DC component. There is a straightforward method to control the DC component by selecting the value of the control bits A2 and A3 to control the value of the running digital sum (RDS). In the bit stream outputted from the extended bit insertion encoder, the number ratio of the parity bits to the information bits is relatively high. Thus, the effective encoding rate is relatively low. Specifically, every two parity check bits P1 and P2 are extended into a 7-bit set "A1-A2-P1-B-P2-A3-A4", and hence the bit number is increased by a factor of 7/2.

Generally, LDPC codes are excellent in decoding performance and block error rate. Like turbo codes and RA (repeat and accumulate) codes, LDPC codes provide a near-Shannon capacity performance when the code length is great. In addition, LDPC codes hardly cause an error floor phenomenon.

In the case where turbo codes and LDPC codes are used for signals to be recorded on optical discs, it is desirable to subject the turbo-code signals and the LDPC-code signals to run-length limitation and DSV (digital sum variation or digital sum value) control to make them in harmony with the transmission-line characteristics of the optical discs. Generally, it is difficult to directly calculate the desired states of parity bits for turbo-code signals and LDPC-code signals subjected to run-length limitation and DSV control.

U.S. Pat. No. 6,297,753 B1 corresponding to Japanese patent application publication number P2000-286709A discloses a modulation system for encoding every "p"-bit block of digital data into a "q"-bit code word, serially connecting the resultant code words, and thereby converting the digital data into a code-word sequence in the form of a bit stream which observes run length limiting rules such that a minimum zero-run-length and a maximum zero-run-length are equal to 3 T and 11 T respectively. The modulation system in U.S. Pat. No. 6,297,753 B1 includes a plurality of encoding tables for converting "p"-bit input data words into "q"-bit output code words. Each of the encoding tables lists output code words and state-information pieces assigned to input data words. The state-information pieces are designed to select one among the encoding tables which will be accessed for the conversion of a next input data word. Furthermore, the group of encoding tables is designed so that the NRZI modulation results of output code words in specified encoding tables which are assigned to each predetermined input data word are opposite in parity or polarity ("odd-even" in the number of bits of "1"). This design of the encoding tables is utilized in performing DSV control of the output-code-word sequence.

There is a background-art data modulation system implementing both DSV control and LDPC (low density parity check) encoding. The background-art system is not prior art to this invention, and is described in Japanese patent application publication number P2005-78687A corresponding to U.S. patent application Ser. No. 10/885,320 filed on Jul. 7, 2004. The background-art system includes a set of encoding tables, and a first device for modulating "m"-bit input data words into "n"-bit information code words respectively by referring to the encoding tables, where "m" denotes a first predetermined natural number equal to an integer multiple of 4 and "n" denotes a second predetermined natural number equal to an integer multiple of 6, and the number "n" is greater than the number "m". The encoding tables contain information code words assigned to input data words, and contain table selection information accompanying each information code word. The table selection information designates one among the encoding tables which is used next to generate an information code word immediately following the information code word accompanied with the table selection information. Information code words in first specified one of the encoding tables which are assigned to prescribed input data words are opposite in polarity of DSV to information code words in second specified one of the encoding tables which are assigned to the prescribed input data words.

In the background-art system, a second device generates a final information code word in response to a current input data word different from the prescribed input data words by referring to one of the encoding tables. A third device generates a first candidate information code word in response to a current input data word equal to one of the prescribed input data words by referring to the first specified one of the encoding tables. A fourth device generates a second candidate information code word in response to the current input data word equal to said one of the prescribed input data words by referring to the second specified one of the encoding tables. A fifth device generates a first succession of information code words including the final information code word generated by the second device and the first candidate information code word generated by the third device. A sixth device generates a second succession of information code words including the final information code word generated by the second device and the second candidate information code word generated by the fourth device. A seventh device calculates a first DSV from the first succession of information code words which is generated by the fifth device. An eighth device calculate a second DSV from the second succession of information code words which is generated by the sixth device. A ninth device determines which of an absolute value of the first DSV calculated by the seventh device and an absolute value of the second DSV calculated by the eighth device is smaller. A tenth device selects one from the first succession of information code words and the second succession of information code words which corresponds to the smaller DSV absolute value determined by the ninth device as at least a part of a final information-code-word sequence. An eleventh device generates parity check bits in response to every block of the final information-code-word sequence and a predetermined parity generation matrix of LDPC encoding. A twelfth device converts the parity check bits generated by the eleventh device into conversion code words respectively. Each of the conversion code words includes three bits among which two bits are "0" and one bit is "1". A thirteenth device combines every block of the final information-code-word sequence and the related conversion code words generated by the twelfth device into an output-code-word sequence which obeys $(1, k)$ RLL (run length limiting rules), where "k" is a predetermined natural number in the range of 9 to 12. The addition of the parity check bits to the information bit stream reduces the effective encoding rate.

SUMMARY OF THE INVENTION

It is a first object of this invention to provide a recording apparatus implementing modulation suited for the recording of a signal of a run-length-limited code on a recording medium which can suppress an increase in the number of parity bits added to an original information bit stream.

It is a second object of this invention to provide a reproducing apparatus for recovering original information from a modulation-resultant signal generated and recorded by the recording apparatus of this invention.

It is a third object of this invention to provide a recording medium for storing a modulation-resultant signal generated by the recording apparatus of this invention.

A first aspect of this invention provides a recording apparatus comprising a first run length encoder for implementing run length modulation of a first information signal to convert the first information signal into a second information signal of a prescribed run-length-limited code while subjecting the second information signal to DSV control and adding a sync signal to the second information signal to get a third information signal; a converter for converting the third information signal generated by the first run length encoder into an NRZI signal including information code words; a parity generator for generating original parity signals in response to the information code words in the NRZI signal according to a prescribed error correction scheme, and combining the information code words and the original parity signals to form a first parity-added signal; a second run length encoder for implementing run length modulation of only the original parity signals in the first parity-added signal to get modulated parity signals of the prescribed run-length-limited code, and thereby converting the first parity-added signal into a second parity-added signal inclusive of the information code words and the modulated parity signals while subjecting the second parity-added signal to DSV control; and means for recording the second parity-added signal generated by the second run length encoder on a recording medium.

A second aspect of this invention provides a recording apparatus comprising a first run length encoder for implementing run length modulation of a first information signal to convert the first information signal into a second information signal of a prescribed run-length-limited code while subjecting the second information signal to DSV control and adding a sync signal to the second information signal to get a third information signal; a parity generator for using the third information signal generated by the first run length encoder as information code words, generating original parity signals in response to the information code words according to a prescribed error correction scheme, and combining the information code words and the original parity signals to form a first parity-added signal; a second run length encoder for implementing run length modulation of only the original parity signals in the first parity-added signal to get modulated parity signals of the prescribed run-length-limited code, and thereby converting the first parity-added signal into a second parity-added signal inclusive of the information code words and the modulated parity signals while subjecting the second parity-added signal to DSV control; a converter for converting the second parity-added signal generated by the second run length encoder into an NRZI signal; and means for recording the NRZI signal generated by the converter on a recording medium.

A third aspect of this invention provides a reproducing apparatus comprising means for reproducing a signal of a prescribed run-length-limited code, which contains information code words and first parity signals, from a recording medium to get a reproduced signal; an equalization circuit for subjecting the reproduced signal to partial-response equalization to get an equalization-result signal; a viterbi decoder for decoding the equalization-result signal into first binary data inclusive of the information code words and the first parity signals; a first run length decoder for implementing run length decoding of only the first parity signals in the first binary data to get decoded parity signals, and thereby converting the first binary data into second binary data inclusive of the information code words and the decoded parity signals; an error correction device for subjecting the second binary data generated by the first run length decoder to error correction responsive to the decoded parity signals to get error-corrected data being an NRZI signal; a converter for converting the NRZI signal generated by the error correction device into an NRZ signal; and a second run length decoder for implementing run length decoding of the NRZ signal generated by the converter to get a fully decoded signal.

A fourth aspect of this invention provides a reproducing apparatus comprising means for reproducing a signal of a prescribed run-length-limited code, which contains information code words and first parity signals, from a recording medium to get a reproduced signal; an equalization circuit for subjecting the reproduced signal to partial-response equalization to get an equalization-result signal; a viterbi decoder for decoding the equalization-result signal into first binary data inclusive of the information code words and the first parity signals, the first binary data being an NRZI signal; a converter for converting the NRZI signal generated by the viterbi decoder into an NRZ signal inclusive of the information code words and the first parity signals; a first run length decoder for implementing run length decoding of only the first parity signals in the NRZ signal to get decoded parity signals, and thereby converting the NRZ signal into a partially decoded signal inclusive of the information code words and the decoded parity signals; an error correction device for subjecting the partially decoded signal generated by the first run length decoder to error correction responsive to the decoded parity signals to get error-corrected information code words; and a second run length decoder for implementing run length decoding of the error-corrected information code words generated by the error correction device to get a fully decoded signal.

A fifth aspect of this invention provides a recording medium storing the second parity-added signal which has been recorded by the recording apparatus in the first aspect of this invention.

A sixth aspect of this invention provides a recording medium storing the NRZI signal which has been recorded by the recording apparatus in the second aspect of this invention.

A seventh aspect of this invention provides a recording apparatus comprising a first run length encoder for implementing run length modulation of a first information signal to get a second information signal of a prescribed run-length-limited code; a converter for converting the second information signal generated by the first run length encoder into an NRZI signal including information code words; a parity generator for generating original parity signals in response to the information code words in the NRZI signal, and combining the information code words and the original parity signals to form a first parity-added signal; a second run length encoder for implementing run length modulation of only the original parity signals in the first parity-added signal to get modulated parity signals of the prescribed run-length-limited code, and thereby converting the first parity-added signal into a second parity-added signal inclusive of the information code words and the modulated parity signals; and means for recording the second parity-added signal generated by the second run length encoder on a recording medium.

An eighth aspect of this invention provides a recording apparatus comprising a first run length encoder for implementing run length modulation of a first information signal to get a second information signal of a prescribed run-length-limited code; a parity generator for using the second information signal generated by the first run length encoder as information code words, generating original parity signals in response to the information code words, and combining the information code words and the original parity signals to form a first parity-added signal; a second run length encoder for implementing run length modulation of only the original parity signals in the first parity-added signal to get modulated parity signals of the prescribed run-length-limited code, and thereby converting the first parity-added signal into a second parity-added signal inclusive of the information code words and the modulated parity signals; a converter for converting the second parity-added signal generated by the second run length encoder into an NRZI signal; and means for recording the NRZI signal generated by the converter on a recording medium.

This invention has advantages as follows. According to the recording apparatus of this invention, it is possible to suppress an increase in the number of parity bits added to an original information bit stream. Therefore, the addition of parity bits to the original information bit stream causes only a small drop in an encoding rate. The DC characteristics of the modulation-resultant information bit stream are substantially equal to ideal ones defined by the run length modulation.

In the recording apparatus of this invention, the NRZ signal is converted into the NRZI signal, and the parity signals are generated in response to the NRZI signal. Thereby, it is possible to substantially equalize the probabilities of the occurrence of "1" and "0" with respect to the original signal, and the parity signals can provide sufficient effects.

In the reproducing apparatus of this invention, the first and second run length decoders can be formed by a common circuit. Therefore, the reproducing apparatus of this invention can be relatively small in circuit scale.

BRIEF DESCRIPTION OF THE DRAWINGS

FIG. 3 is a general flowchart of a segment of a control program for a computer-based device in the first embodiment of this invention.

FIG. 4 is a diagram of an input signal and an output signal with respect to 8-16 modulation implemented by a parity-section run length encoding circuit in FIG. 1.

FIG. 5 is a diagram of a portion of a conversion table used by 8-16 modulation.

DETAILED DESCRIPTION OF THE INVENTION

First Embodiment

Figure 1:
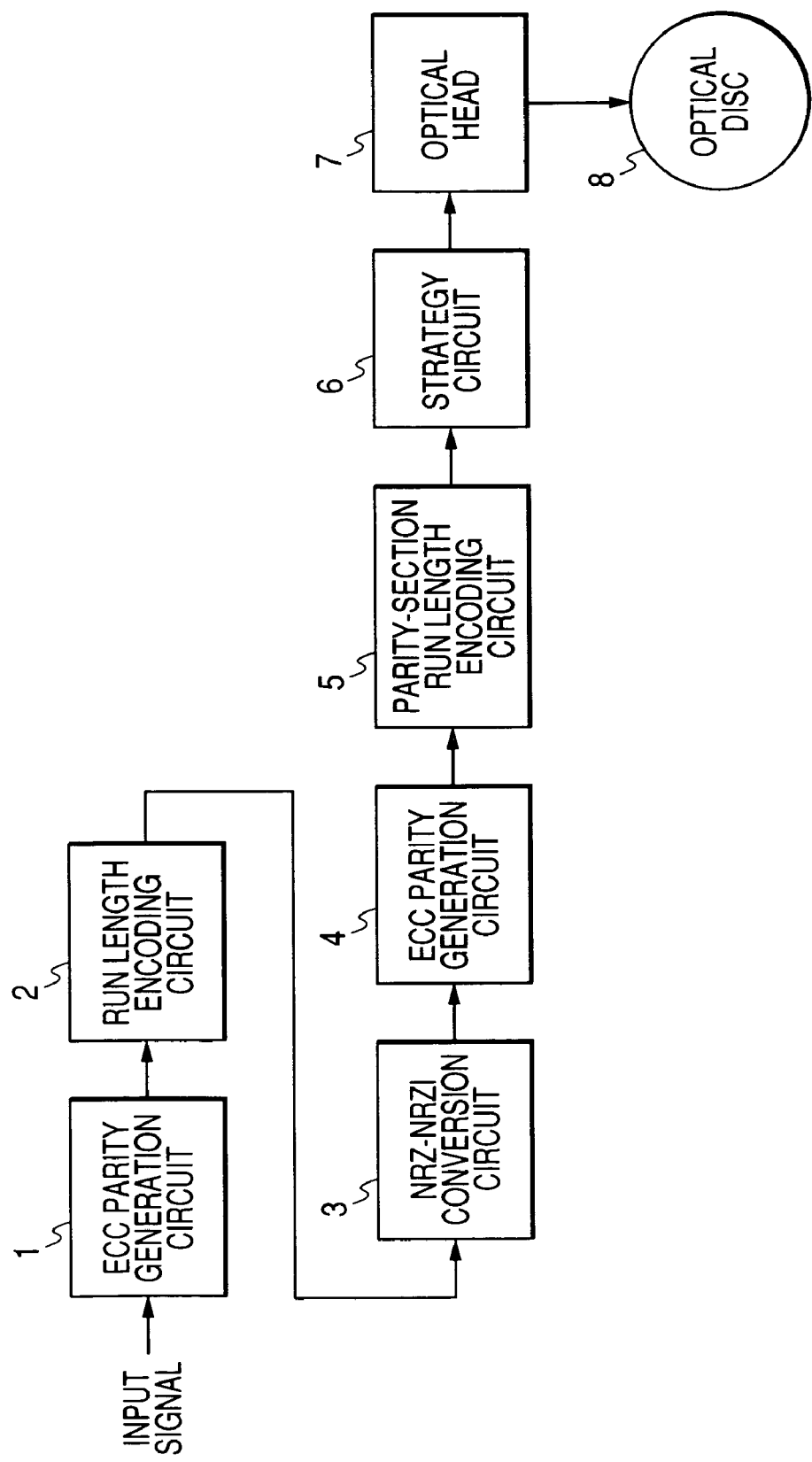
FIG. 1 is a block diagram of a recording apparatus according to a first embodiment of this invention.

FIG. 1 shows a recording apparatus according to a first embodiment of this invention. The recording apparatus of FIG. 1 includes a first ECC parity generation circuit 1, a run length encoding circuit 2, an NRZ-NRZI conversion circuit 3, a second ECC parity generation circuit 4, a parity-section run length encoding circuit 5, and a strategy circuit 6 which are sequentially connected in that order. The strategy circuit 6 is followed by an optical head 7 which can act on an optical disc 8. The optical disc 8 is an information recording medium.

Input data (user data) representing digital information to be recorded is fed to the first ECC parity generation circuit 1. The first ECC parity generation circuit 1 produces first ECC (error checking and correcting) parity signals in response to the input data according to a first prescribed error correction scheme. The first ECC parity signals correspond to outer code words and include, for example, RS (Reed Solomon) code signals. The first ECC parity generation circuit 1 adds the first ECC parity signals to the input data to get information code words. The first ECC parity generation circuit 1 outputs the information code words to the run length encoding circuit 2.

The run length encoding circuit 2 implements the run length encoding (the run length modulation) of the information code words. Specifically, the run length encoding circuit 2 converts the information code words into a sequence of words of a prescribed run-length-limited code. The run length encoding circuit 2 holds the sequence of words of the run-length-limited code under DSV (digital sum variation or digital sum value) control. The conversion and the DSV control by the run length encoding circuit 2 are designed to match a finally recorded signal with the characteristics of a recording medium, that is, the optical disc 8. The run length encoding circuit 2 repetitively adds a sync signal of a fixed pattern to the sequence of words of the run-length-limited code. The run length encoding circuit 2 outputs the sync-added sequence of words of the run-length-limited code to the NRZ-NRZI conversion circuit 3.

The sync-added sequence of words of the run-length-limited code is an NRZ (non return to zero) signal which assumes a high level for a bit of "1", and which assumes a low level for a bit of "0". The NRZ-NRZI conversion circuit 3 changes the NRZ signal into a corresponding NRZI (non return to zero inverted) signal. The NRZI signal has a level transition for a bit of "1", and maintains a previous level for a bit of "0". The NRZ-NRZI conversion circuit 3 outputs the NRZI signal to the second ECC parity generation circuit 4.

The second ECC parity generation circuit 4 produces second ECC parity signals in response to the NRZI signal according to a second prescribed error correction scheme. The second ECC parity signals correspond to inner code words and include, for example, turbo code signals or LDPC (low density parity check) code signals. The second ECC parity generation circuit 4 adds the second ECC parity signals to the NRZI signal to get information code words. The second ECC parity generation circuit 4 sequentially outputs the information code words to the parity-section run length encoding circuit 5. The operation of the second ECC parity generation circuit 4 corresponds to, for example, LDPC modulation or turbo code modulation.

The parity-section run length encoding circuit 5 implements the run length encoding of only the second ECC parity signals in the information code words. Specifically, the parity-section run length encoding circuit 5 converts the second ECC parity signals into parity words of the run-length-limited code. The parity-section run length encoding circuit 5 holds an information bit stream inclusive of the parity words of the run-length-limited code under the DSV control. The conversion and the DSV control by the parity-section run length encoding circuit 5 are designed to match a finally recorded signal with the characteristics of a recording medium, that is, the optical disc 8. As explained above, the parity-section run length encoding circuit 5 subjects only the second ECC parity signals in the information code words to the run length limitation and the DSV control. Therefore, it is possible to restrain a drop in encoding efficiency to a small value. In addition, it is possible to provide DC characteristics equal to those defined by the original run length encoding. The parity-section run length encoding circuit 5 outputs the resultant code word sequence to the strategy circuit 6.

The strategy circuit 6 converts the code word sequence into a high-frequency pulse train for modulation of a laser beam. The strategy circuit 6 feeds the high-frequency pulse train to the optical head 7. The optical head 7 applies the laser beam to the optical disc 8 and modulates the laser beam in accordance with the high-frequency pulse train, thereby recording the code word sequence on the optical disc 8. As a result, the digital information fed to the first ECC parity generation circuit 1 is recorded on the optical disc 8.

In the recording apparatus of FIG. 1, the run length encoding (the run length modulation) by the run length encoding circuit 2 is on a block-by-block basis. Specifically, the run length encoding circuit 2 separates the information code words outputted from the first ECC parity generation circuit 1 into groups called blocks (ECC blocks). The run length encoding circuit 2 implements the run length encoding of information code words inclusive of first ECC parity signals for every block. Thus, the run length encoding circuit 2 starts the run length encoding of every block after that of the previous block has been completed. Thereby, it is possible to keep continuity of state transition in the run length encoding. Furthermore, the DSV control by the run length encoding circuit 2 is secure and reliable.

Figure 2:
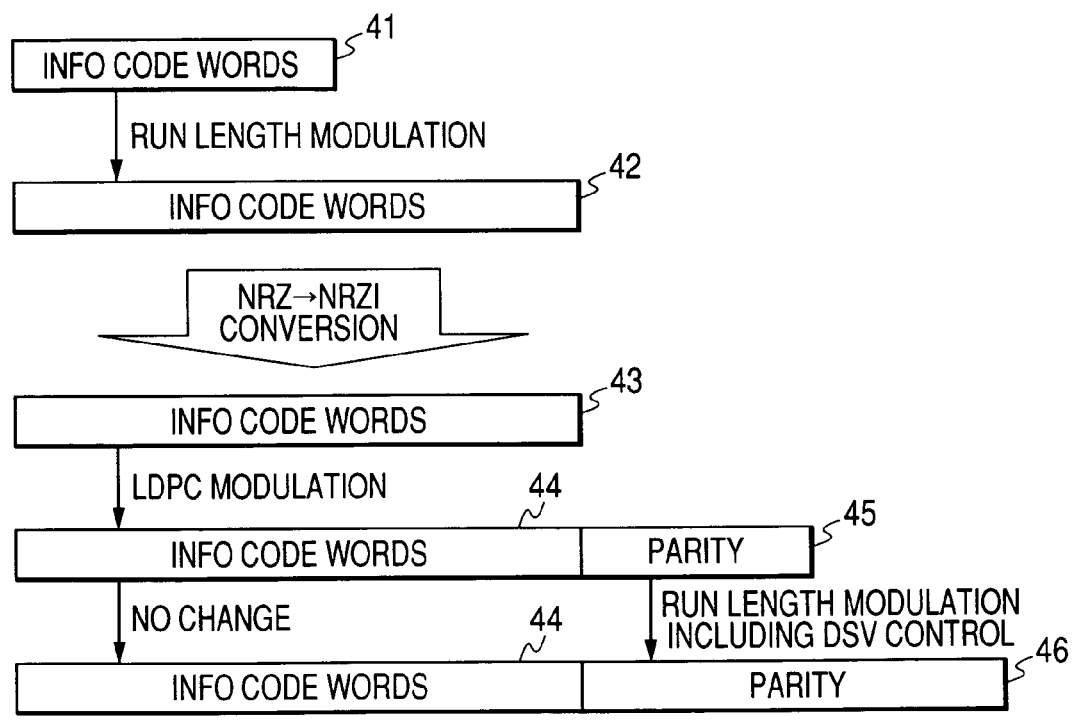
FIG. 2 is a diagram of signals generated in the recording apparatus of FIG. 1.

With reference to FIG. 2, information code words 41 produced by the first ECC parity generation circuit 1 contain input data and first ECC parity signals (for example, RS code signals). The information code words 41 are subjected to run length modulation (run length encoding) by the run length encoding circuit 2, being converted into modulation-resultant information code words 42 constituting an NRZ signal. A bit stream formed by the modulation-resultant information code words 42 is under DSV control.

Then, the modulation-resultant information code words 42 undergo NRZ-NRZI conversion in the NRZ-NRZI conversion circuit 3, being converted into conversion-resultant information code words 43 constituting an NRZI signal. Second ECC parity signals 45 are generated by the second ECC parity generation circuit 4 in response to the conversion-resultant information code words 43. The second ECC parity signals 45 correspond to inner code words and include, for example, turbo code signals or LDPC code signals. The conversion-resultant information code words 43 are used as main information code words 44. A combination of the main information code words 44 and the second ECC parity signals 45 is outputted from the second ECC parity generation circuit 4. The generation and addition of the second ECC parity signals 45 by the second ECC parity generation circuit 4 correspond to, for example, LDPC modulation or turbo code modulation.

Only the second ECC parity signals 45 in the output signal of the second ECC parity generation circuit 4 is subjected to run length modulation (run length encoding) by the parity-section run length encoding circuit 5. As a result, the second ECC parity signals 45 are converted into modulation-resultant second ECC parity signals 46. An information bit stream inclusive of the modulation-resultant second ECC parity signals 46 is under the DSV control. On the other hand, the main information code words 44 in the output signal of the second ECC parity generation circuit 4 remain as they are. A combination of the main information code words 44 and the modulation-resultant second ECC parity signals 46 is outputted from the parity-section run length encoding circuit 5. Since only the second ECC parity signals 45 in the output signal of the second ECC parity generation circuit 4 undergo the run length limitation, it is possible to remarkably suppress an increase in number of bits composing a parity-added signal fed to the strategy circuit 6.

The first ECC parity generation circuit 1, the run length encoding circuit 2, the NRZ-NRZI conversion circuit 3, the second ECC parity generation circuit 4, and the parity-section run length encoding circuit 5 can be formed by a computer-based device having a combination of an input/output port, a processing unit, a ROM, and a RAM. The computer-based device operates in accordance with a control program stored in the ROM.

FIG. 3 is a general flowchart of a segment of the control program for the computer-based device. Preferably, the program segment is executed for every ECC block. Thus, in this case, the program segment is repetitively executed.

With reference to FIG. 3, a first step RS0 of the program segment generates first ECC parity signals in response to input data. The first ECC parity signals correspond to outer code words and include, for example, RS code signals. The step RS0 adds the first ECC parity signals to the input data to get information code words.

A step RS1 following the step RS0 implements the run length encoding (the run length modulation) of the information code words generated by the step RS0. Specifically, the step RS1 converts the information code words into a sequence of words of a prescribed run-length-limited code. The step RS1 holds the sequence of words of the run-length-limited code under DSV control. Preferably, the step RS1 adds a sync signal of a fixed pattern to the sequence of words of the run-length-limited code. As a result, the step RS1 generates a sync-added sequence of words of the run-length-limited-code which forms an NRZ signal.

A step RS2 subsequent to the step RS1 converts the NRZ signal generated by the step RS1 into an NRZI signal.

A step RS3 following the step RS2 produces second ECC parity signals in response to the NRZI signal generated by the step RS2. The second ECC parity signals correspond to inner code words and include, for example, turbo code signals or LDPC code signals. The step RS3 adds the second ECC parity signals to the NRZI signal to get information code words. The generation and addition of the second ECC parity signals by the step RS3 correspond to, for example, LDPC modulation or turbo code modulation.

A step RS4 subsequent to the step RS3 implements the run length encoding (the run length modulation) of only the second ECC parity signals in the information code words generated by the step RS3. Specifically, the step RS4 converts the second ECC parity signals into parity words of the run-length-limited code. The step RS4 holds an information bit stream inclusive of the parity words of the run-length-limited code under the DSV control. The step RS4 generates a combination of the modulation-resultant second ECC parity signals and the non-modulated portions of the information code words which is fed to the strategy circuit 6. After the step RS4, the current execution cycle of the program segment ends.

The run length modulation by the parity-section run length encoding circuit 5 uses 1-7 pp modulation in a 1T system or 8-16 modulation in a 2T system which includes table-based conversion, where T denotes a channel clock period.

The 1-7 pp modulation utilizes a conversion table listing sets of data bits and sets of modulation bits which are assigned to the respective sets of data bits. The 1-7 pp modulation divides a source bit stream (a data bit stream) into sets of data bits, and converts the sets of data bits into corresponding sets of modulation bits by referring to the conversion table. The bit-number (bit-length) ratio of every set of modulation bits to a corresponding set of data bits is 3/2. The 1-7 pp modulation is designed so that an output bit stream formed by the sets of modulation bits will keep (1, 7) RLL (run length limiting rules), and that the parity ("odd-even" in the number of bits of "1") of every set of modulation bits in the output bit stream will be the same as that of a corresponding set of data bits in the source bit stream. According to (1, 7) RLL, 1 to 7 successive bits of "0" should be between bits of "1".

With reference to FIG. 4, the 8-16 modulation divides an input signal into words each having 8 successive bits. The 8-16 modulation converts the 8-bit input words into corresponding 16-bit output words respectively by referring to a conversion table. The 16-bit output words constitute an output signal. The 8-16 modulation is designed so that an output bit stream formed by the output signal will keep prescribed run length limiting rules, and that the parity ("odd-even" in the number of bits of "1") of every output word in the output signal will be the same as that of a corresponding input word in the input signal. An example of a portion of the conversion table is shown in FIG. 5. The conversion table lists 256 different input words, a first group (s(i)=1) of output words assigned to the respective input words and accompanied with respective state information pieces s(i+1), a second group (s(i)=2) of output words assigned to the respective input words and accompanied with respective state information pieces s(i+1), a third group (s(i)=3) of output words assigned to the respective input words and accompanied with respective state information pieces s(i+1), and a fourth group (s(i)=4) of output words assigned to the respective input words and accompanied with respective state information pieces s(i+1). Only input words of "0", "1", "2", "3", "4", "5", "6", "7", and "8" in decimal notation are shown in FIG. 5. Each state information piece s(i+1) designates which of the first, second, third, and fourth groups should be used next. Specifically, one among the first, second, third, and fourth groups will be used next which has a value s(i) equal to the value of a state information piece s(i+1).

In the case where an initial state information value is "1" and input words of "8" and "2" successively come, the 8-16 modulation is implemented as follows. Since the initial state information value is "1", the first group (s(i)=1) of output words in the conversion table is used for the first input word being "8". Therefore, an output word of "0010000010010000" which is assigned to an input word of "8" is selected from the first group as a modulation result for the first input word being "8" (see FIG. 5). An output word of "0010000010010000" is accompanied with a state information piece s(i+1) of "3" as denoted by d1 in FIG. 5. Thus, the state information value is "3", and the third group (s(i)=3) of output words in the conversion table is used for the second input word being "2". Therefore, an output word of "1000000100100000" which is assigned to an input word of "2" is selected from the third group as a modulation result for the second input word being "2" (see FIG. 5). An output word of "1000000100100000" is accompanied with a state information piece s(i+1) of "1" as denoted by d2 in FIG. 5.

The 1-7 pp modulation by the parity-section run length encoding circuit 5 increases the bit number of the second ECC parity signals by a factor of 3/2. The 8-16 modulation by the parity-section run length encoding circuit 5 increases the bit number of the second ECC parity signals by a factor of 16/8. On the other hand, the previously-mentioned prior-art example reported by Hongwei Song et al. increases the bit number by a factor of 7/2. Accordingly, the run length modulation by the parity-section run length encoding circuit 5 remarkably suppresses an increase in the bit number. Thus, digital information can be recorded on the optical disc 8 at a higher density.

After digital information to be recorded undergoes the NRZ-NRZI conversion in the NRZ-NRZI conversion circuit 3, second ECC parity signals are generated by the second ECC parity generation circuit 4 in response to the resultant digital information. The NRZ-NRZI conversion approximately equalizes the probability of the occurrence of a bit of "0" and the probability of the occurrence of a bit of "1" in the conversion-resultant signal. Therefore, it is possible to enhance the accuracy of the calculation of likelihood information.

Second Embodiment

Figure 6:
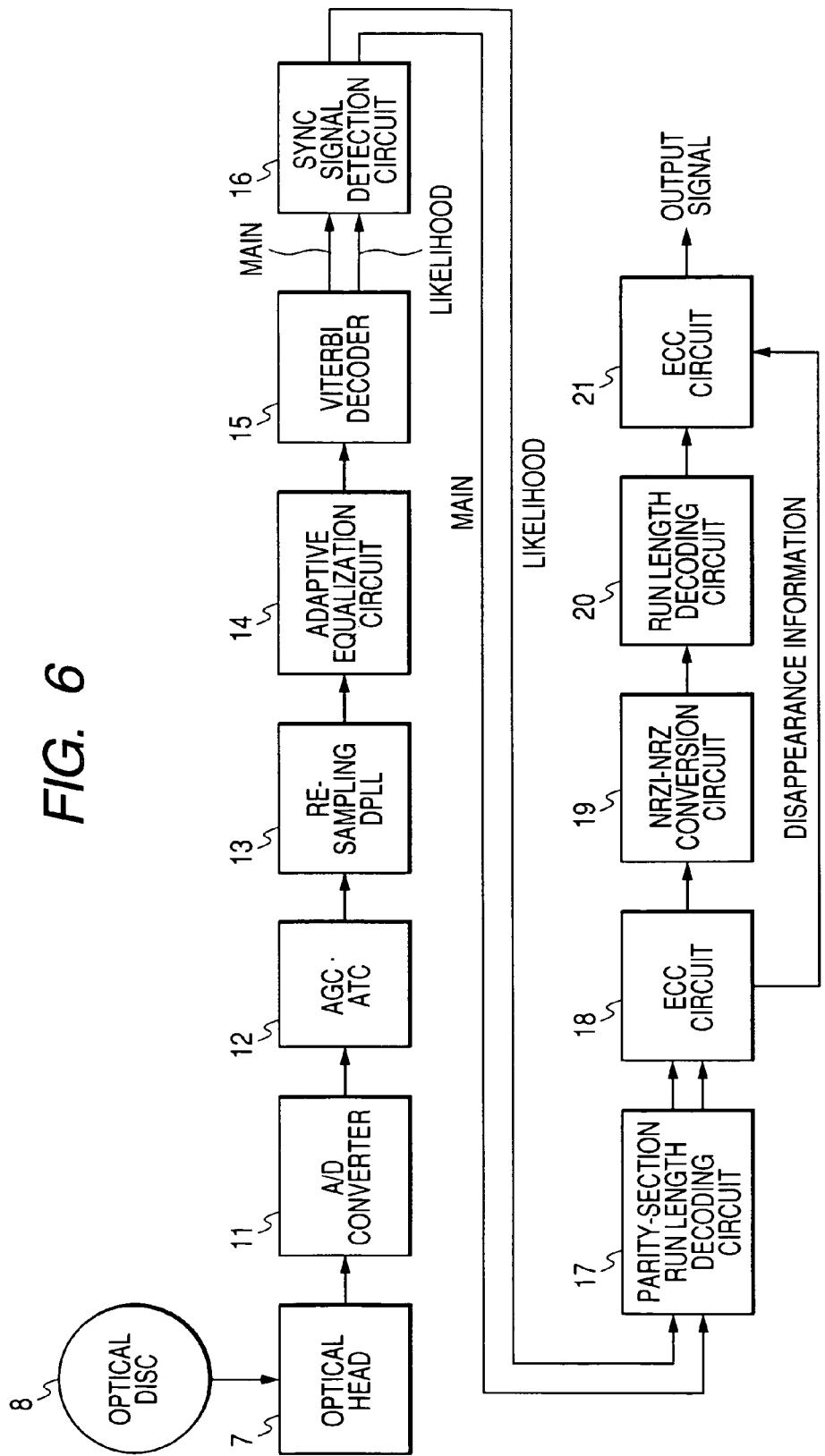
FIG. 6 is a block diagram of a reproducing apparatus according to a second embodiment of this invention.

FIG. 6 shows a reproducing apparatus according to a second embodiment of this invention. As shown in FIG. 6, the reproducing apparatus includes an optical head 7, an A/D converter 11, an AGC and ATC circuit 12, a re-sampling DPLL (digital phase locked loop) 13, an adaptive equalization circuit 14, a viterbi decoder 15, a sync signal detection circuit 16, a parity-section run length decoding circuit 17, a first ECC circuit 18, an NRZI-NRZ conversion circuit 19, a run length decoding circuit 20, and a second ECC circuit 21 which are sequentially connected in that order. Furthermore, the first ECC circuit 18 and the second ECC circuit 21 are directly connected. The optical head 7 can act on an optical disc 8. The optical disc 8 is an information recording medium. In general, digital information has been recorded on the optical disc 8 by the recording apparatus of FIG. 1.

The optical head 7 reads out a recorded signal from the optical disc 8. The read-out signal contains information code words, first ECC parity signals, second ECC parity signals, and a repetitively-occurring sync signal. The optical head 7 outputs the read-out signal to the A/D converter 11. The A/D converter 11 changes the output signal of the optical head 7 into a corresponding digital signal. Specifically, the A/D converter 11 periodically samples the output signal of the optical head 7 in response to a fixed-frequency master clock signal (a fixed-frequency system clock signal), and converts every resultant sample into a digital sample forming a segment of the digital signal. The A/D converter 11 outputs the digital signal to the AGC and ATC circuit 12. The AGC and ATC circuit 12 subjects the output signal of the A/D converter 11 to automatic gain control (AGC) for providing a constant signal amplitude and also automatic threshold control (ATC) including proper direct-current (DC) control of threshold values used for two-value comparison. The AGC and ATC circuit 12 outputs the resultant signal to the re-sampling DPLL 13.

The re-sampling DPLL 13 converts the output signal (the first digital signal) of the AGC and ATC circuit 12 into a second digital signal. The re-sampling DPLL 13 includes a digital PLL (phase locked loop) circuit having a closed loop. The digital PLL circuit re-samples the output signal of the AGC and ATC circuit 12 in response to a bit clock signal to get the second digital signal (the re-sampling resultant signal). A timing related to samples of the output signal of the AGC and ATC circuit 12 is determined by the system clock signal. A timing related to samples of the second digital signal is determined by the bit clock signal. Preferably, samples of the second digital signal have a phase of 180° with respect to the bit clock signal. Samples of the second digital signal may have a phase of 0° with respect to the bit clock signal. The re-sampling implemented by the digital PLL circuit includes at least one of interpolation and decimation designed to generate samples of the re-sampling-resultant signal from samples of the output signal of the AGC and ATC circuit 12. The re-sampling DPLL 13 outputs the second digital signal (the re-sampling-resultant signal) to a transversal filter within the adaptive equalization circuit 14. The second digital signal is also referred to as the main digital signal or the main output signal of the re-sampling DPLL 13.

The re-sampling DPLL 13 includes an interpolator which estimates every sample at a given phase point (for example, a phase point of 0° or 180°) with respect to the bit clock signal from the output signal of the AGC and ATC circuit 12. Thus, the interpolator generates a sequence of given-phase-point data samples. The interpolator outputs the sequence of given-phase-point data samples to the transversal filter within the adaptive equalization circuit 14 as the main digital signal (the second digital signal or the re-sampling-resultant signal). The re-sampling DPLL 13 also includes a zero-cross detector for sensing every point (every zero-cross point) at which the sequence of given-phase-point data samples crosses a zero level (a 0 level). The zero-cross detector generates 0-point information which represents every sensed zero-cross point in the bit clock unit. Specifically, the zero-cross detector decides whether or not every phase-point data sample corresponds to a zero-cross point. The zero-cross detector generates 0-point information in response to the result of the decision. Furthermore, the zero-cross detector generates a phase error in response to every sensed zero-cross point. In the re-sampling DPLL 13, the timing of the re-sampling or the frequency and phase of the re-sampling are locked in response to the levels represented by zero-cross-point-corresponding samples of the second digital signal so that the phase error will be equal to "0". The re-sampling DPLL 13 outputs the 0-point information to the adaptive equalization circuit 14 as a sub output signal.

Figure 7:
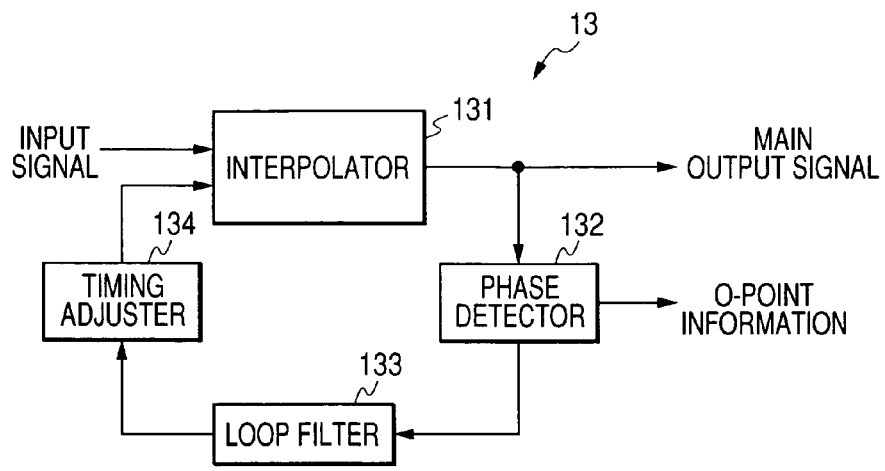
FIG. 7 is a block diagram of a re-sampling DPLL in FIG. 6.

As shown in FIG. 7, the re-sampling DPLL 13 includes an interpolator 131, a phase detector 132, a loop filter 133, and a timing adjuster 134 which are connected in a closed loop in that order. The interpolator 131 receives the output signal of the AGC and ATC circuit 12. The interpolator 131 receives data point phase information and the bit clock signal from the timing adjuster 134. The interpolator 131 estimates given-phase-point data samples from samples of the output signal of the AGC and ATC circuit 12 through interpolation responsive to the data point phase information and the bit cock signal. Here, "phase" is defined relative to the bit clock signal. The interpolator 131 outputs the estimated given-phase-point data samples to the transversal filter within the adaptive equalization circuit 14 as the main digital signal (the second digital signal or the re-sampling-resultant signal). The interpolator 131 also outputs the estimated given-phase-point data samples to the phase detector 132.

In the re-sampling DPLL 13, the phase detector 132 senses zero-cross points from the given-phase-point data samples. Furthermore, the phase detector 132 detects a phase error in response to a data value of the re-sampling resultant signal which occurs at each of the sensed zero-cross points. In addition, the phase detector 132 generates 0-point information representing the sensed zero-cross points. The phase detector 132 outputs the 0-point information (the sub output signal) to the adaptive equalization circuit 14. The phase detector 132 generates a signal representing the phase error. The phase detector 132 outputs the phase error signal to the loop filter 133. The loop filter 133 integrates the phase error signal. The loop filter 133 outputs the integration-resultant signal to the timing adjuster 134. The timing adjuster 134 produces the data point phase information and the bit clock signal in response to the output signal of the loop filter 133. The timing adjuster 134 feeds the data point phase information and the bit clock signal to the interpolator 131.

With reference back to FIG. 6, the adaptive equalization circuit 14 subjects the main output signal of the re-sampling DPLL 13 (that is, the second digital signal outputted from the re-sampling DPLL 13) to automatic waveform equalization in response to the 0-point information fed from the re-sampling DPLL 13. The automatic waveform equalization corresponds to a process of providing the signal in question with a partial-response (PR) characteristic. The adaptive equalization circuit 14 outputs the equalization-resultant signal to the viterbi decoder 15. The viterbi decoder 15 subjects the equalization-resultant signal to viterbi decoding which includes SOVA (soft output viterbi algorithm) decoding or MAP (maximum a posteriori probability) decoding. The viterbi decoder 15 generates decoding-resultant binary data forming a reproduced signal of recorded digital information. The viterbi decoder 15 outputs the decoding-resultant binary data to the sync signal detection circuit 16 as a main signal. The viterbi decoder 15 generates likelihood information about the decoding-resultant binary data (the main signal). The viterbi decoder 15 outputs the likelihood information to the sync signal detection circuit 16 as a sub signal.

The sync signal detection circuit 16 detects every sync signal in the main signal from the viterbi decoder 15. The sync signal detection circuit 16 removes every detected sync signal from the main signal. The sync signal detection circuit 16 outputs the resultant main signal to the parity-section run length decoding circuit 17. The sync signal detection circuit 16 passes the sub signal (the likelihood information) from the viterbi decoder 15 to the parity-section run length decoding circuit 17.

The parity-section run length decoding circuit 17 subjects only second ECC parity signals in the main signal to run length decoding (run length demodulation) to get the partial-decoding-resultant main signal. At the same time, the parity-section run length decoding circuit 17 converts the likelihood information. The parity-section run length decoding circuit 17 outputs the partial-decoding-resultant main signal and the conversion-resultant likelihood information to the first ECC circuit 18. The run length decoding by the parity-section run length decoding circuit 17 is inverse with respect to the run length encoding by the parity-section run length encoding circuit 5 in FIG. 1.

The first ECC circuit 18 subjects the partial-decoding-resultant main signal to error correction responsive to related second ECC parity signals contained therein. The second ECC parity signals correspond to inner code words and include, for example, turbo code signals or LDPC code signals. The error correction include parity checks. As a result of the error correction, the first ECC circuit 18 generates an error-corrected main signal. The error-corrected main signal is an NRZI signal. The first ECC circuit 18 feeds the NRZI signal, that is, the error-corrected main signal, to the NRZI-NRZ conversion circuit 19. The first ECC circuit 18 notifies the results of the parity checks to the second ECC circuit 21 as disappearance information. The first ECC circuit 18 is a counterpart of the second ECC parity generation circuit 4 in FIG. 1. The error correction by the first ECC circuit 18 corresponds to, for example, LDPC demodulation or turbo code demodulation.

The NRZI-NRZ conversion circuit 19 changes the NRZI signal into a corresponding NRZ signal. The NRZI-NRZ conversion circuit 19 outputs the NRZ signal to the run length decoding circuit 20. The NRZI-NRZ conversion circuit 19 is a counterpart of the NRZ-NRZI conversion circuit 3 in FIG. 1.

The run length decoding circuit 20 subjects the NRZ signal to run length decoding (run length demodulation) to get the full-decoding-resultant main signal. The decoding by the run length decoding circuit 20 is inverse with respect to the encoding by the run length encoding circuit 2 in FIG. 1. The run length decoding circuit 20 outputs the full-decoding-resultant main signal to the second ECC circuit 21.

The second ECC circuit 21 subjects the full-decoding-resultant main signal to error correction responsive to first ECC parity signals contained therein and the disappearance information from the first ECC circuit 18, thereby recovering original digital information. The first ECC parity signals correspond to outer code words and include, for example, RS (Reed Solomon) code signals. The second ECC circuit 21 is a counterpart of the first ECC parity generation circuit 1 in FIG. 1. The second ECC circuit 21 outputs the recovered digital information.

Figure 8:
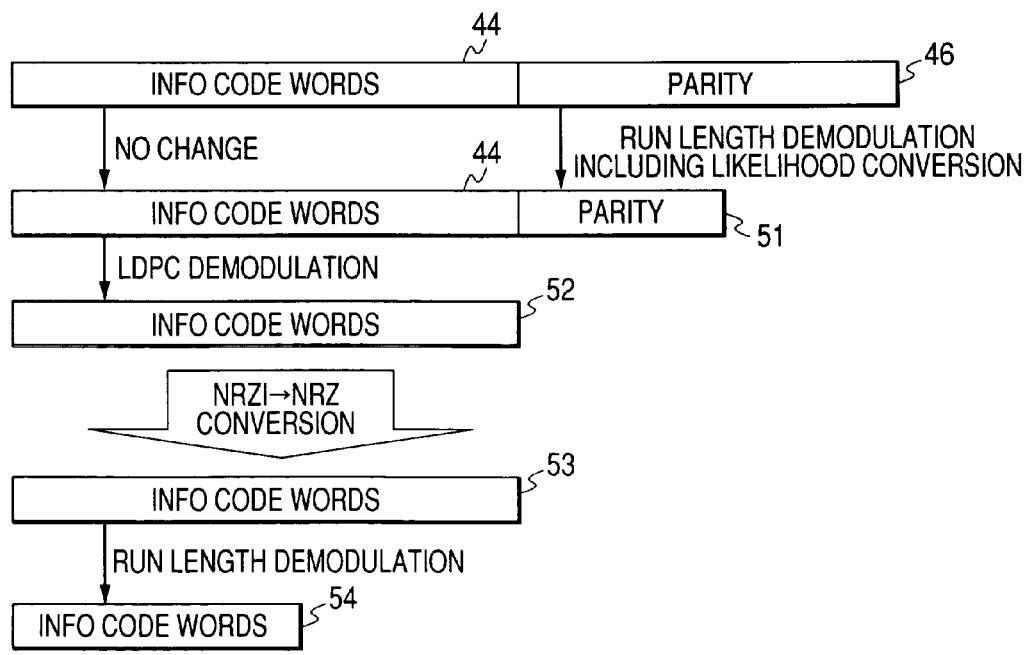
FIG. 8 is a diagram of signals generated in the reproducing apparatus of FIG. 6.

With reference to FIG. 8, the main signal inputted to the parity-section run length decoding circuit 17 has a combination of main information code words 44 and modulation-resultant second ECC parity signals 46. Only the modulation-resultant second ECC parity signals 46 in the main signal undergo run length demodulation (run length decoding) in the parity-section run length decoding circuit 17. At the same time, likelihood conversion is carried out by the parity-section run length decoding circuit 17. As a result of the run length demodulation, the modulation-resultant second ECC parity signals 46 change into original second ECC parity signals (demodulation-resultant second ECC parity signals) 51. The second ECC parity signals 51 correspond to the second ECC parity signals 45 in FIG. 2. On the other hand, the main information code words 44 remain as they are during this stage.

The main information code words 44 are subjected to error correction by the first ECC circuit 18 in response to the second ECC parity signals 51. As a result of the error correction, the main information code words 44 change into error-corrected information code words 52. The second ECC parity signals 51 correspond to inner code words and include, for example, turbo code signals or LDPC code signals. The error correction by the first ECC circuit 18 corresponds to, for example, LDPC demodulation or turbo code demodulation. The error-corrected information code words 52 constitute an NRZI signal.

The error-corrected information code words 52 undergo NRZI-NRZ conversion in the NRZI-NRZ conversion circuit 19, thereby changing into NRZ information code words 53. The NRZ information code words 53 are subjected to run length demodulation (run length decoding) by the run length decoding circuit 20. As a result of the run length demodulation, the NRZ information code words 53 are converted into original information code words 54. The information code words 54 correspond to the information code words 41 in FIG. 2.

The parity-section run length decoding circuit 17, the first ECC circuit 18, the NRZI-NRZ conversion circuit 19, and the run length decoding circuit 20 can be formed by a computer-based device having a combination of an input/output port, a processing unit, a ROM, and a RAM. The computer-based device operates in accordance with a control program stored in the ROM.

Figure 9:
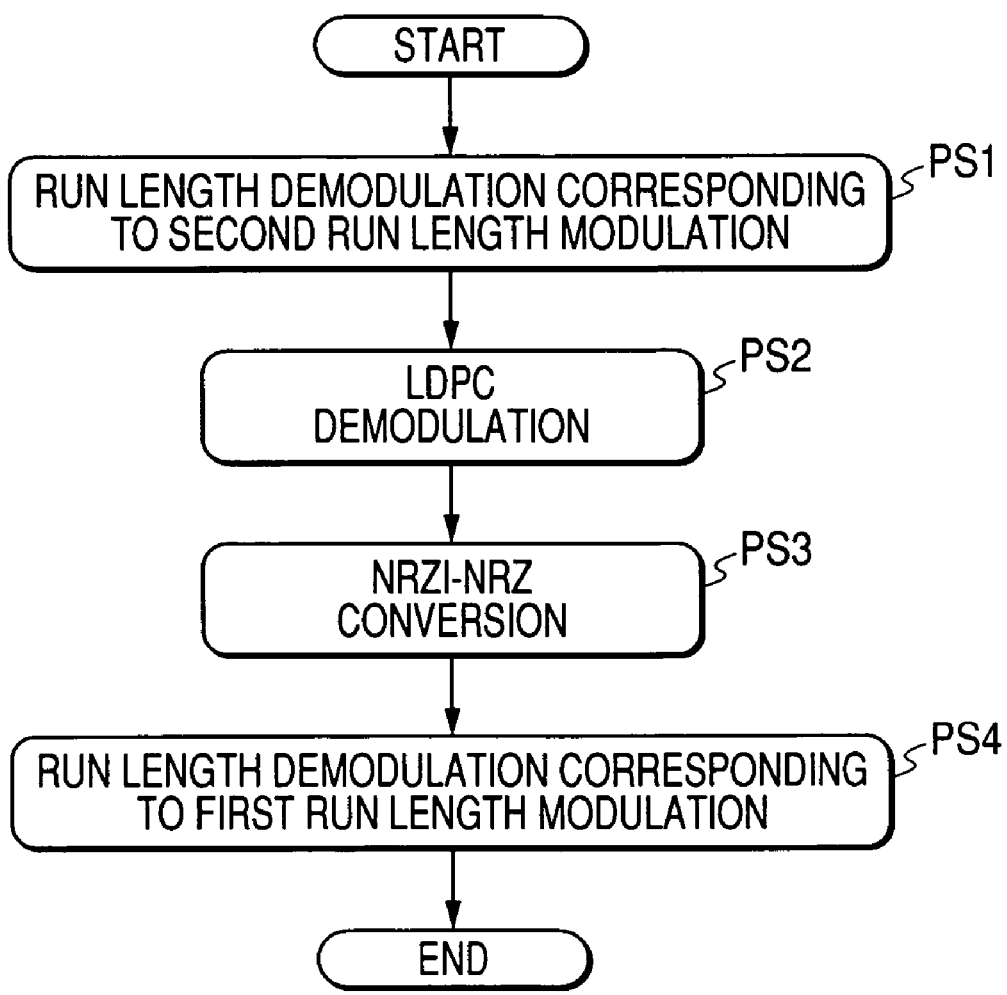
FIG. 9 is a general flowchart of a segment of a control program for a computer-based device in the second embodiment of this invention.

FIG. 9 is a general flowchart of a segment of the control program for the computer-based device. Preferably, the program segment is executed for every ECC block. Thus, in this case, the program segment is repetitively executed.

With reference to FIG. 9, a first step PS1 of the program segment subjects only second ECC parity signals in the main signal from the sync signal detection circuit 16 to run length decoding (run length demodulation) to get the partial-decoding-resultant main signal. At the same time, the step PS1 converts the likelihood information fed from the sync signal detection circuit 16.

A step PS2 following the step PS1 subjects the partial-decoding-resultant main signal to error correction responsive to related second ECC parity signals contained therein, and thereby generates an error-corrected main signal. The second ECC parity signals correspond to inner code words and include, for example, turbo code signals or LDPC code signals. The error-corrected main signal is an NRZI signal. The error correction by the step PS2 corresponds to, for example, LDPC demodulation or turbo code demodulation.

A step PS3 subsequent to the step PS2 converts the NRZI signal generated by the step PS2 into an NRZ signal.

A step PS4 following the step PS3 subjects the NRZ signal to run length decoding (run length demodulation) to get the full-decoding-resultant main signal. The full-decoding-resultant main signal is fed to the second ECC circuit 21. After the step PS4, the current execution cycle of the program segment ends.

Third Embodiment

Figure 10:
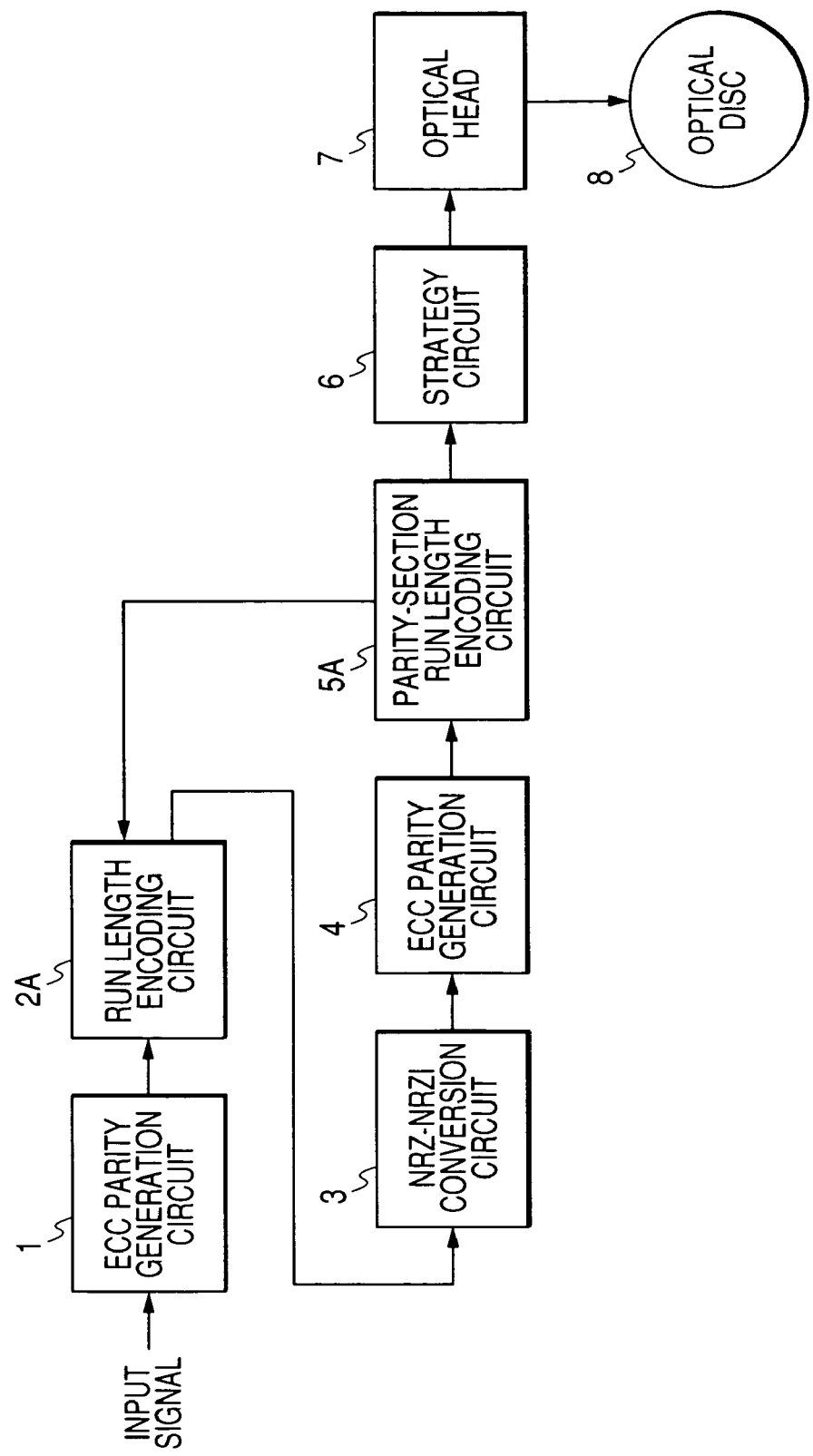
FIG. 10 is a block diagram of a recording apparatus according to a third embodiment of this invention.

FIG. 10 shows a recording apparatus according to a third embodiment of this invention. The recording apparatus of FIG. 10 is similar to that of FIG. 1 except for design changes described hereafter.

The recording apparatus of FIG. 10 includes a run length encoding circuit 2A and a parity-section run length encoding circuit 5A instead of the run length encoding circuit 2 and the parity-section run length encoding circuit 5 (see FIG. 1). The run length encoding circuit 2A is connected with the parity-section run length encoding circuit 5A.

The run length encoding circuit 2A receives the information code words from the first ECC parity generation circuit 1. In addition, the run length encoding circuit 2A receives a condition signal from the parity-section run length encoding circuit 5A which represents the result of the run length encoding by the parity-section run length encoding circuit 5A. The run length encoding circuit 2A implements the run length encoding (the run length modulation) of the received information code words in response to the received condition signal. Specifically, the run length encoding circuit 2A converts the information code words into a sequence of words of a prescribed run-length-limited code in response to the condition signal. The run length encoding circuit 2A holds the sequence of words of the run-length-limited code under DSV control. The conversion and the DSV control by the run length encoding circuit 2A are designed to match a finally recorded signal with the characteristics of a recording medium, that is, the optical disc 8. The run length encoding circuit 2A repetitively adds a sync signal of a fixed pattern to the sequence of words of the run-length-limited code. The run length encoding circuit 2A outputs the sync-added sequence of words of the run-length-limited code to the NRZ-NRZI conversion circuit 3.

The parity-section run length encoding circuit 5A receives the information code words from the second ECC parity generation circuit 4. The parity-section run length encoding circuit 5A implements the run length encoding of only the second ECC parity signals in the information code words. Specifically, the parity-section run length encoding circuit 5A converts the second ECC parity signals into parity words of the run-length-limited code. The parity-section run length encoding circuit 5A holds an information bit stream inclusive of the parity words of the run-length-limited code under the DSV control. The conversion and the DSV control by the parity-section run length encoding circuit 5A are designed to match a finally recorded signal with the characteristics of a recording medium, that is, the optical disc 8. The parity-section run length encoding circuit 5A outputs the resultant code word sequence to the strategy circuit 6. In addition, the parity-section run length encoding circuit 5A outputs a condition signal to the run length encoding circuit 2A which represents the result of the run length encoding by the parity-section run length encoding circuit 5A.

The run length encoding (the run length modulation) by the run length encoding circuit 2A is on a block-by-block basis. The run length encoding by the parity-section run length encoding circuit 5A is also on a block-by-block basis. The run length encoding of the current signal block (the current ECC block) by the run length encoding circuit 2A is responsive to the result of the run length encoding of the immediately-preceding signal block (the immediately-preceding ECC block) by the parity-section run length encoding circuit 5A. This design is intended to optimize state transitions in the run length modulation and maximize the effects of the DSV control.

The optical disc 8 has a land or lands. A land in a signal erased state (a crystallized state) totally reflects the laser light emitted from the optical head 7. The optical disc 8 is formed with pits during the recording of an information signal thereon. The pits represent the recorded information signal. The pits are disc portions in an amorphous state. The pits reflect the laser light at a lower rate. The optical head 7 applies the laser light to the optical disc 8, and receives a portion of the laser light reflected at and returned from the optical disc 8. The optical head 7 changes the received laser light into a corresponding electric signal through photoelectric conversion. It is preferable to decide the polarity of the electric signal originating from the laser light reflected at a pit and the polarity of the electric signal originating from the laser light reflected at a land, that is, the direction of the pit and the direction of the land. In this case, it is possible to prevent the occurrence of a polarity change which would adversely affect the LDPC decoding during the signal reproduction.

The first ECC parity generation circuit 1, the run length encoding circuit 2A, the NRZ-NRZI conversion circuit 3, the second ECC parity generation circuit 4, and the parity-section run length encoding circuit 5A can be formed by a computer-based device having a combination of an input/output port, a processing unit, a ROM, and a RAM. The computer-based device operates in accordance with a control program stored in the ROM.

Figure 11:
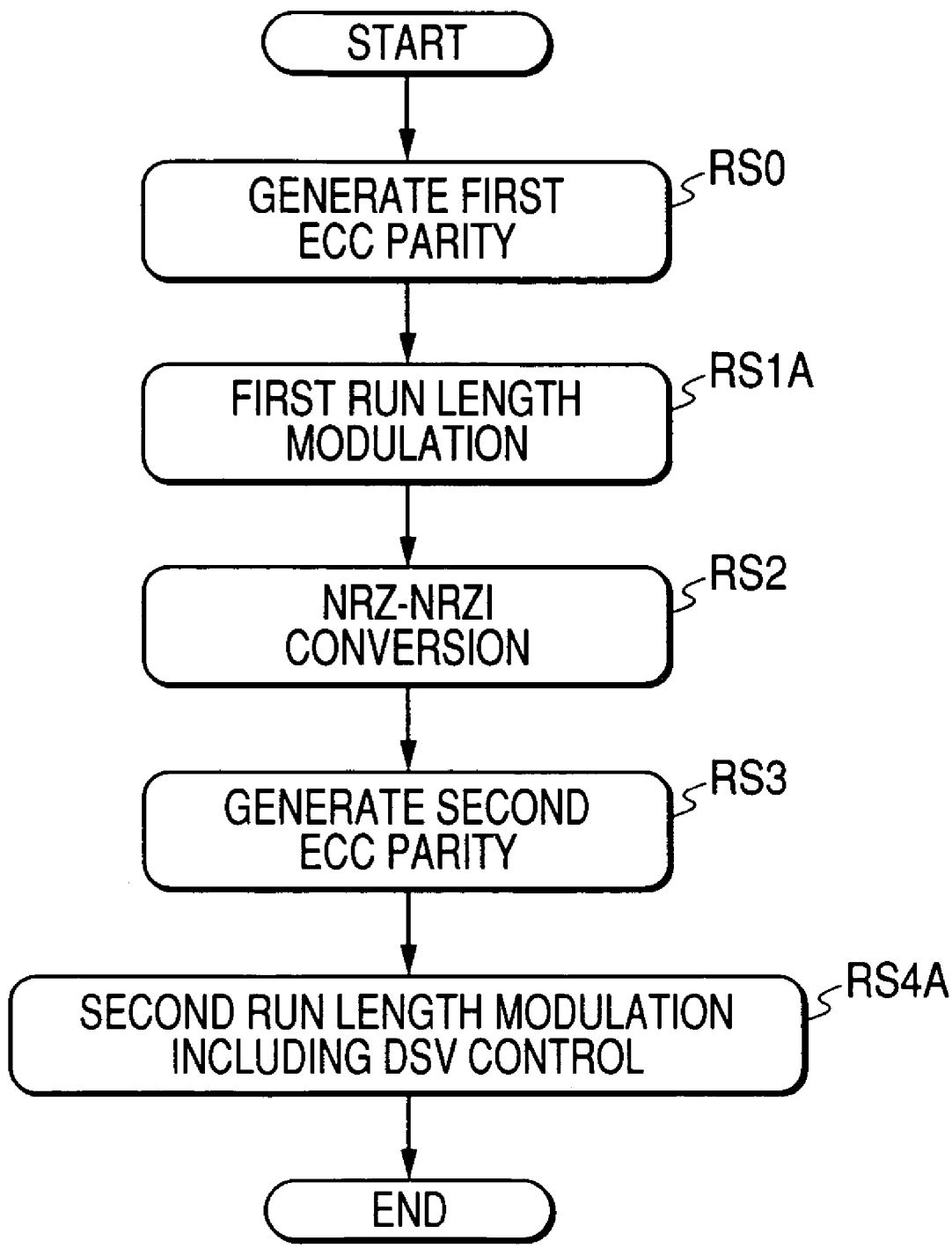
FIG. 11 is a general flowchart of a segment of a control program for a computer-based device in the third embodiment of this invention.

FIG. 11 is a general flowchart of a segment of the control program for the computer-based device. Preferably, the program segment is executed for every ECC block. Thus, in this case, the program segment is repetitively executed.

The program segment in FIG. 11 is similar to the program segment in FIG. 3 except that steps RS1A and RS4A replace the steps RS1 and RS4 respectively.

With reference to FIG. 11, the step RS1A retrieves a condition signal from the RAM. The retrieved condition signal represents the result of the run length encoding of the immediately-preceding ECC block by the step RS4A. Then, the step RS1A implements the run length encoding (the run length modulation) of the current ECC block of the information code words generated by the step RS0 in response to the result of the run length encoding of the immediately-preceding ECC block by the step RS4A. Specifically, the step RS1A converts the current ECC block of the information code words into a sequence of words of a prescribed run-length-limited code in response to the result of the run length encoding of the immediately-preceding ECC block by the step RS4A. The step RS1A holds the sequence of words of the run-length-limited code under DSV control. Preferably, the step RS1A adds a sync signal of a fixed pattern to the sequence of words of the run-length-limited code. As a result, the step RS1A generates a sync-added sequence of words of the run-length-limited code which forms an NRZ signal.

The step RS4A implements the run length encoding (the run length modulation) of only the second ECC parity signals in the current ECC block of the information code words generated by the step RS3. Specifically, the step RS4A converts the second ECC parity signals into parity words of the run-length-limited code. The step RS4A holds an information bit stream inclusive of the parity words of the run-length-limited code under the DSV control. The step RS4A generates a combination of the modulation-resultant second ECC parity signals and the non-modulated portions of the information code words which is fed to the strategy circuit 6. In addition, the step RS4A generates a condition signal representing the result of the run length encoding of only the second ECC parity signals in the current ECC block. The step RS4A stores the generated condition signal into the RAM for later use. After the step RS4A, the current execution cycle of the program segment ends.

Fourth Embodiment

Figure 12:
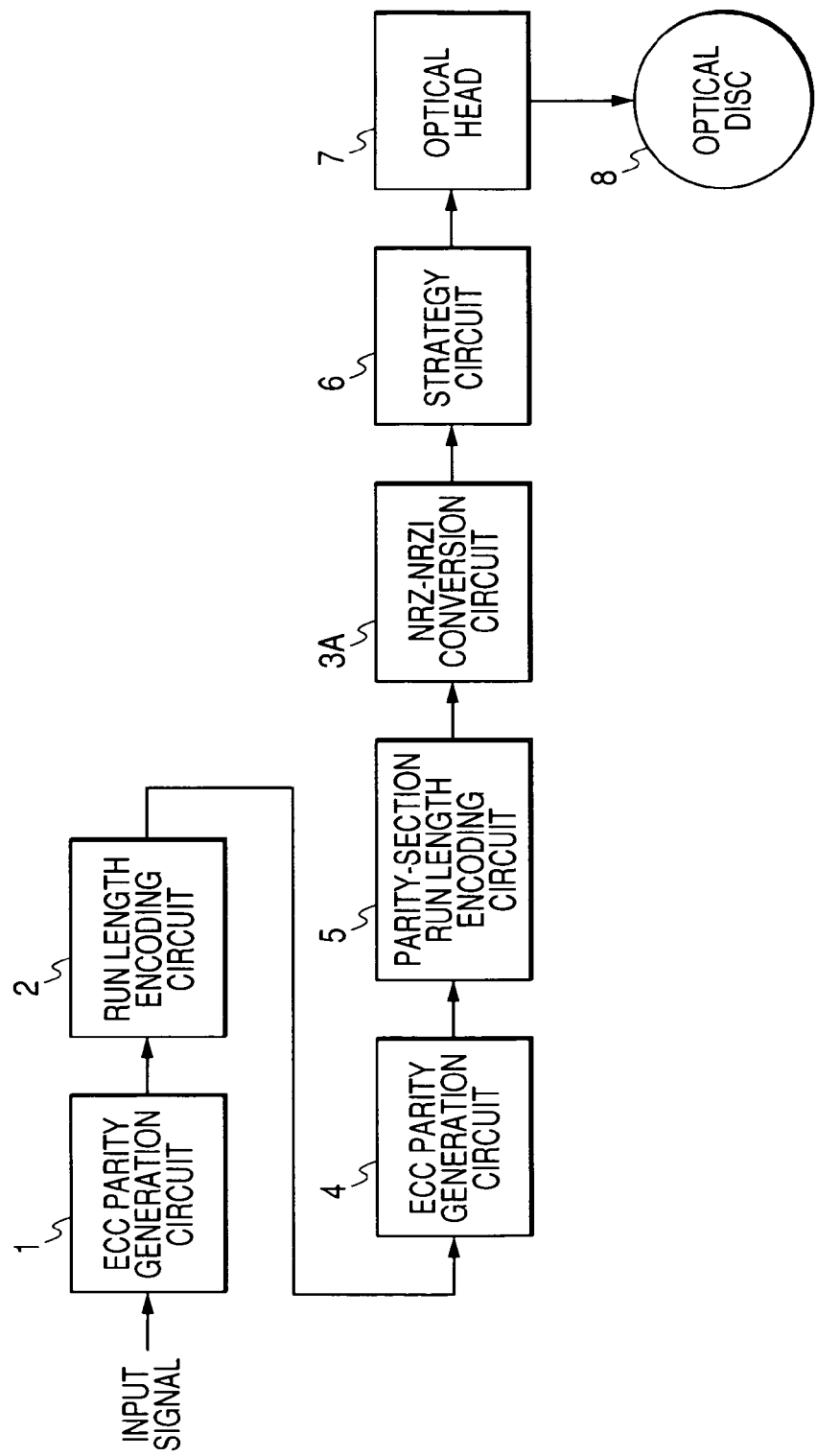
FIG. 12 is a block diagram of a recording apparatus according to a fourth embodiment of this invention.

FIG. 12 shows a recording apparatus according to a fourth embodiment of this invention. The recording apparatus of FIG. 12 is similar to that of FIG. 1 except for design changes described hereafter.

In the recording apparatus of FIG. 12, the run length encoding circuit 2 and the second ECC parity generation circuit 4 are directly connected, and an NRZ-NRZI conversion circuit 3A is interposed between the parity-section run length encoding circuit 5 and the strategy circuit 6.

The second ECC parity generation circuit 4 receives the output signal of the run length encoding circuit 2 which has the sync-added sequence of words of the run-length-limited code. The second ECC parity generation circuit 4 produces second ECC parity signals in response to the output signal of the run length encoding circuit 2. The second ECC parity signals correspond to inner code words and include, for example, turbo code signals or LDPC code signals. The second ECC parity generation circuit 4 adds the second ECC parity signals to the output signal of the run length encoding circuit 2 to get information code words. The second ECC parity generation circuit 4 sequentially outputs the information code words to the parity-section run length encoding circuit 5.

The parity-section run length encoding circuit 5 implements the run length encoding of only the second ECC parity signals in the information code words. Specifically, the parity-section run length encoding circuit 5 converts the second ECC parity signals into parity words of the run-length-limited code. The parity-section run length encoding circuit 5 holds an information bit stream inclusive of the parity words of the run-length-limited code under the DSV control. The parity-section run length encoding circuit 5 outputs the resultant code word sequence to the NRZ-NRZI conversion circuit 3A.

The code word sequence outputted from the parity-section run length encoding circuit 5 is an NRZ signal. The NRZ-NRZI conversion circuit 3A changes the NRZ signal into a corresponding NRZI. The NRZ-NRZI conversion circuit 3A outputs the NRZI signal to the strategy circuit 6.

The strategy circuit 6 converts the NRZI signal into a high-frequency pulse train for modulation of a laser beam. The strategy circuit 6 feeds the high-frequency pulse train to the optical head 7.

Figure 13:
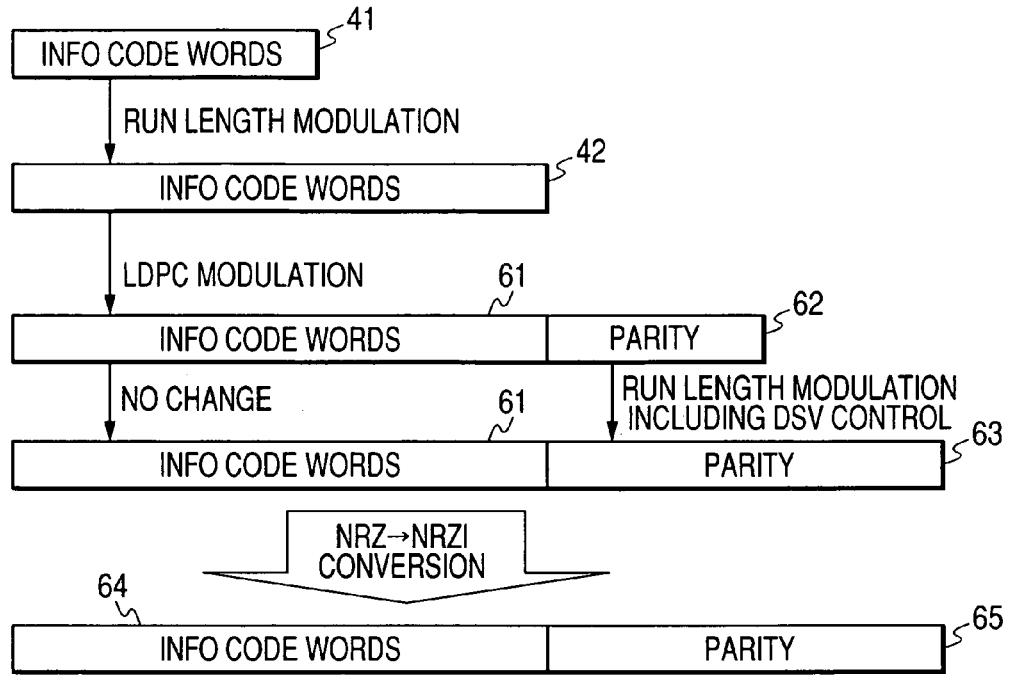
FIG. 13 is a diagram of signals generated in the recording apparatus of FIG. 12.

With reference to FIG. 13, information code words 41 produced by the first ECC parity generation circuit 1 contain input data and first ECC parity signals (for example, RS code signals). The information code words 41 are subjected to run length modulation (run length encoding) by the run length encoding circuit 2, being converted into modulation-resultant information code words 42. A bit stream formed by the modulation-resultant information code words 42 is under DSV control.

Then, second ECC parity signals 62 are generated by the second ECC parity generation circuit 4 in response to the modulation-resultant information code words 42. The second ECC parity signals 62 correspond to inner code words and include, for example, turbo code signals or LDPC code signals. The modulation-resultant information code words 42 are used as main information code words 61. A combination of the main information code words 61 and the second ECC parity signals 62 is outputted from the second ECC parity generation circuit 4.

Only the second ECC parity signals 62 in the output signal of the second ECC parity generation circuit 4 is subjected to run length modulation (run length encoding) by the parity-section run length encoding circuit 5. As a result, the second ECC parity signals 62 are converted into modulation-resultant second ECC parity signals 63. An information bit stream inclusive of the modulation-resultant second ECC parity signals 63 is under the DSV control. On the other hand, the main information code words 61 in the output signal of the second ECC parity generation circuit 4 remain as they are. A combination of the main information code words 61 and the modulation-resultant second ECC parity signals 63 is outputted from the parity-section run length encoding circuit 5. Since only the second ECC parity signals 62 in the output signal of the second ECC parity generation circuit 4 undergo the run length limitation, it is possible to remarkably suppress an increase in number of bits composing a parity-added signal fed to the NRZ-NRZI conversion circuit 3A.

Then, the main information code words 61 and the modulation-resultant second ECC parity signals 63 undergo NRZ-NRZI conversion in the NRZ-NRZI conversion circuit 3A, being converted into conversion-resultant information code words 64 and conversion-resultant second ECC parity signals 65 constituting an NRZI signal.

The first ECC parity generation circuit 1, the run length encoding circuit 2, the second ECC parity generation circuit 4, the parity-section run length encoding circuit 5, and the NRZ-NRZI conversion circuit 3A can be formed by a computer-based device having a combination of an input/output port, a processing unit, a ROM, and a RAM. The computer-based device operates in accordance with a control program stored in the ROM.

Figure 14:
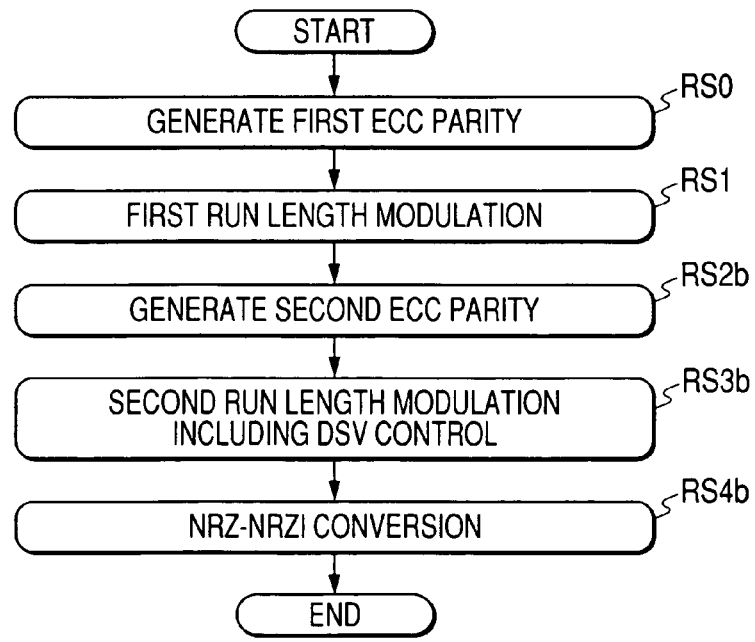
FIG. 14 is a general flowchart of a segment of a control program for a computer-based device in the fourth embodiment of this invention.

FIG. 14 is a general flowchart of a segment of the control program for the computer-based device. Preferably, the program segment is executed for every ECC block. Thus, in this case, the program segment is repetitively executed.

The program segment in FIG. 14 is similar to the program segment in FIG. 3 except that steps RS2b, RS3b, and RS4b replace the steps RS2, RS3, and RS4 respectively.

With reference to FIG. 14, the step RS2b produces second ECC parity signals in response to the sync-added sequence of words of the run-length-limited code generated by the step RS1. The second ECC parity signals correspond to inner code words and include, for example, turbo code signals or LDPC code signals. The step RS2b adds the second ECC parity signals to the sync-added sequence of words of the run-length-limited code to get information code words.

The step RS3b implements the run length encoding (the run length modulation) of only the second ECC parity signals in the information code words generated by the step RS2b. Specifically, the step RS3b converts the second ECC parity signals into parity words of the run-length-limited code. The step RS3b holds an information bit stream inclusive of the parity words of the run-length-limited code under the DSV control. The step RS3b generates an NRZ signal formed by a combination of the modulation-resultant second ECC parity signals and the non-modulated portions of the information code words.

The step RS4b converts the NRZ signal generated by the step RS3b into an NRZI signal which is fed to the strategy circuit 6. After the step RS4b, the current execution cycle of the program segment ends.

Fifth Embodiment

Figure 15:
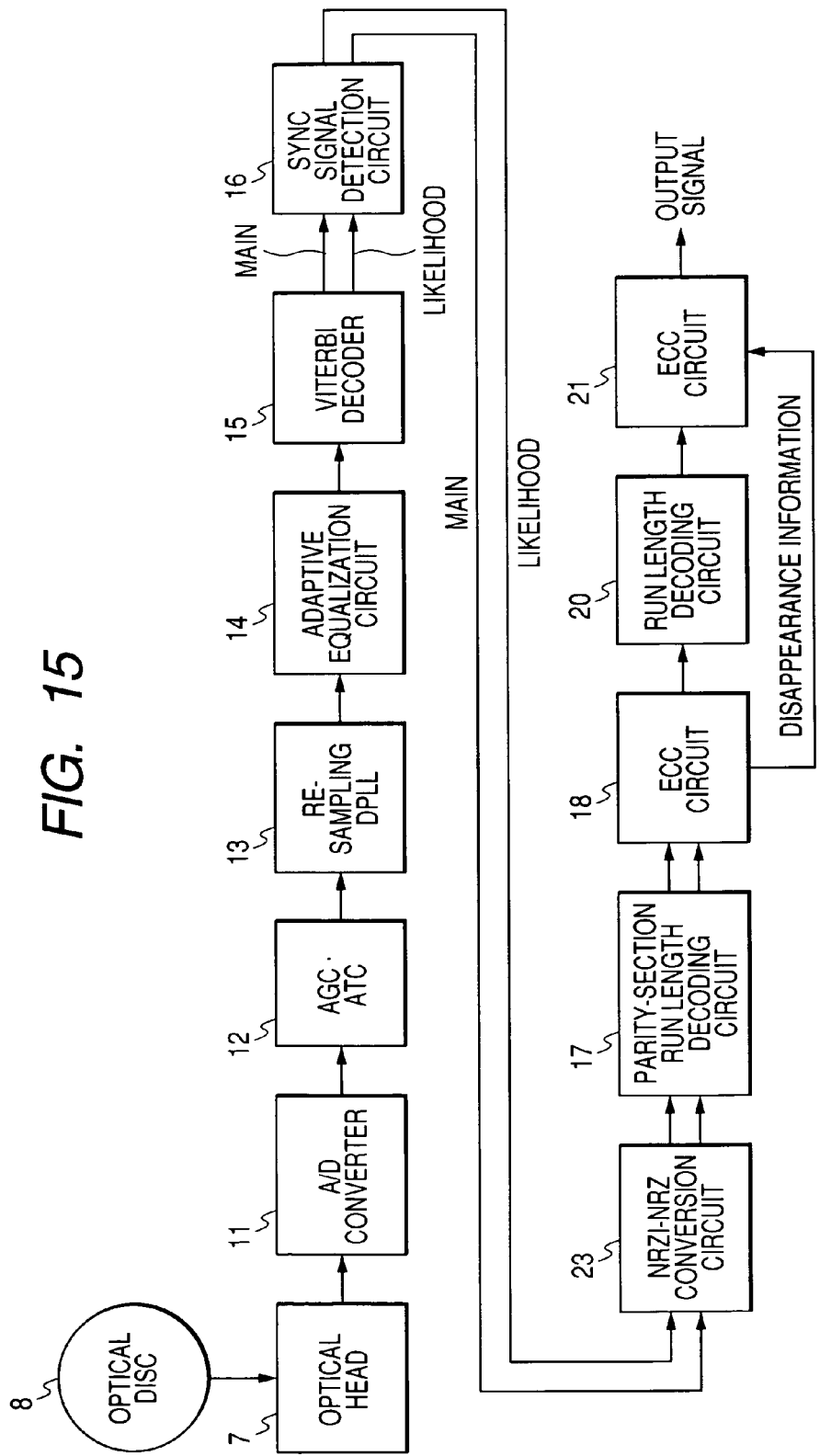
FIG. 15 is a block diagram of a reproducing apparatus according to a fifth embodiment of this invention.

FIG. 15 shows a reproducing apparatus according to a fifth embodiment of this invention. The reproducing apparatus in FIG. 15 can reproduce an information signal from the optical disc 8 which has been recorded by the recording apparatus in FIG. 12. The reproducing apparatus of FIG. 15 is similar to that of FIG. 6 except for design changes described hereafter.

In the reproducing apparatus of FIG. 15, an NRZI-NRZ conversion circuit 23 is interposed between the sync signal detection circuit 16 and the parity-section run length decoding circuit 17, and the first ECC circuit 18 and the run length decoding circuit 20 are directly connected.

The sync signal detection circuit 16 detects every sync signal in the main signal from the viterbi decoder 15. The sync signal detection circuit 16 removes every detected sync signal from the main signal. The resultant main signal is an NRZI signal. The sync signal detection circuit 16 outputs the NRZI main signal to the NRZI-NRZ conversion circuit 23. The sync signal detection circuit 16 passes the sub signal (the likelihood information) from the viterbi decoder 15 to the NRZI-NRZ conversion circuit 23.

The NRZI-NRZ conversion circuit 23 changes the NRZI main signal into a corresponding NRZ main signal. The NRZI-NRZ conversion circuit 23 outputs the NRZ main signal to the parity-section run length decoding circuit 17. The NRZI-NRZ conversion circuit 23 is a counterpart of the NRZ-NRZI conversion circuit 3A in FIG. 12. The NRZI-NRZ conversion circuit 23 passes the likelihood information to the parity-section run length decoding circuit 17.

The parity-section run length decoding circuit 17 subjects only second ECC parity signals in the NRZ main signal to run length decoding (run length demodulation) to get the partial-decoding-resultant main signal. At the same time, the parity-section run length decoding circuit 17 converts the likelihood information. The parity-section run length decoding circuit 17 outputs the partial-decoding-resultant main signal and the conversion-resultant likelihood information to the first ECC circuit 18.

The first ECC circuit 18 subjects the partial-decoding-resultant main signal to error correction responsive to related second ECC parity signals contained therein. The second ECC parity signals correspond to inner code words and include, for example, turbo code signals or LDPC code signals. The error correction include parity checks. As a result of the error correction, the first ECC circuit 18 generates an error-corrected main signal. The first ECC circuit 18 feeds the error-corrected main signal to the run length decoding circuit 20. The first ECC circuit 18 notifies the results of the parity checks to the second ECC circuit 21 as disappearance information.

The run length decoding circuit 20 subjects the error-corrected main signal to run length decoding (run length demodulation) to get the full-decoding-resultant main signal. The run length decoding circuit 20 outputs the full-decoding-resultant main signal to the second ECC circuit 21.

Figure 16:
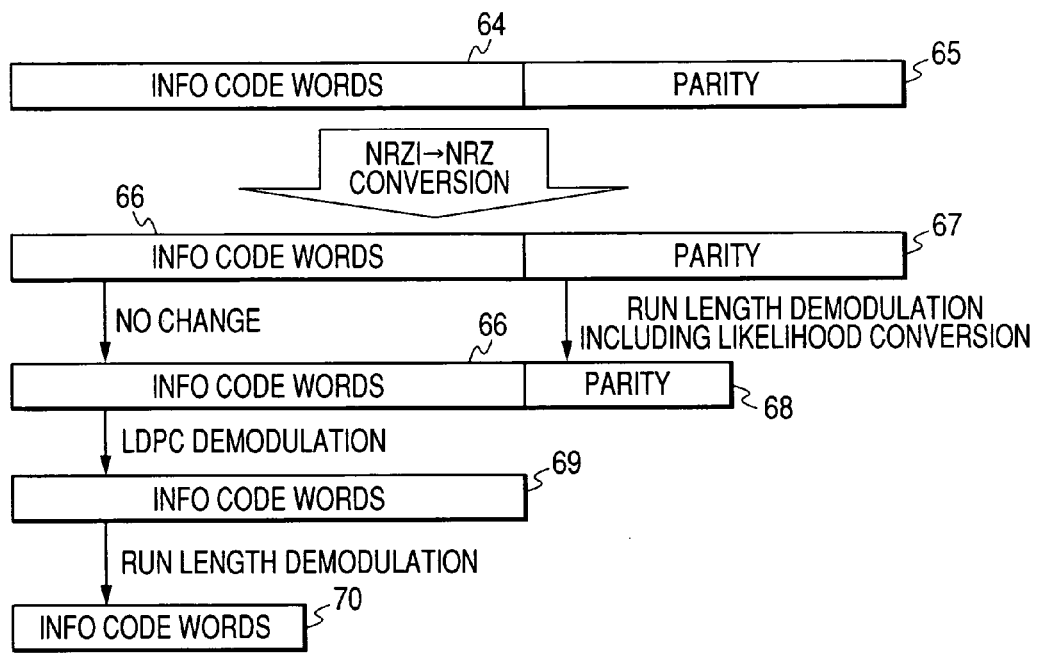
FIG. 16 is a diagram of signals generated in the reproducing apparatus of FIG. 15.

With reference to FIG. 16, the NRZI main signal inputted to the NRZI-NRZ conversion circuit 23 has a combination of main information code words 64 and modulation-resultant second ECC parity signals 65. The main information code words 64 and the modulation-resultant second ECC parity signals 65 undergo NRZI-NRZ conversion in the NRZI-NRZ conversion circuit 23, thereby changing into NRZ information code words 66 and NRZ second ECC parity signals 67. A combination of the NRZ information code words 66 and the NRZ second ECC parity signals is fed to the parity-section run length decoding circuit 17 as an NRZ main signal.

Only the NRZ second ECC parity signals 67 in the NRZ main signal undergo run length demodulation (run length decoding) in the parity-section run length decoding circuit 17. At the same time, likelihood conversion is carried out by the parity-section run length decoding circuit 17. As a result of the run length demodulation, the NRZ second ECC parity signals 67 change into original second ECC parity signals (demodulation-resultant second ECC parity signals) 68. The second ECC parity signals 68 correspond to the second ECC parity signals 62 in FIG. 13. On the other hand, the NRZ information code words 66 remain as they are during this stage.

The NRZ information code words 66 are subjected to error correction by the first ECC circuit 18 in response to the second ECC parity signals 68. As a result of the error correction, the NRZ information code words 66 change into error-corrected information code words 69. The second ECC parity signals 68 correspond to inner code words and include, for example, turbo code signals or LDPC code signals. The error correction by the first ECC circuit 18 corresponds to, for example, LDPC demodulation or turbo code demodulation.

The error-corrected information code words 69 are subjected to run length demodulation (run length decoding) by the run length decoding circuit 20. As a result of the run length demodulation, the error-corrected information code words 69 are converted into original information code words 70. The information code words 70 correspond to the information code words 41 in FIG. 13.

The NRZI-NRZ conversion circuit 23, the parity-section run length decoding circuit 17, the first ECC circuit 18, and the run length decoding circuit 20 can be formed by a computer-based device having a combination of an input/output port, a processing unit, a ROM, and a RAM. The computer-based device operates in accordance with a control program stored in the ROM.

Figure 17:
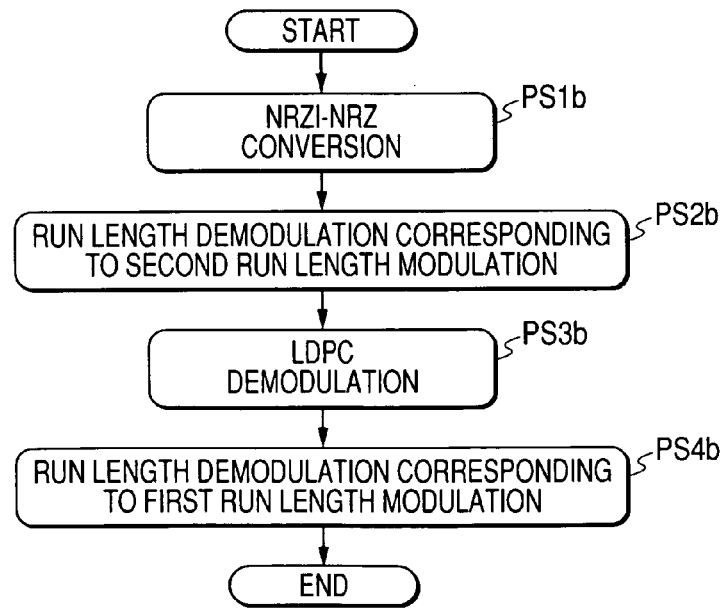
FIG. 17 is a general flowchart of a segment of a control program for a computer-based device in the fifth embodiment of this invention.

FIG. 17 is a general flowchart of a segment of the control program for the computer-based device. Preferably, the program segment is executed for every ECC block. Thus, in this case, the program segment is repetitively executed.

With reference to FIG. 17, a first step PS1b of the program segment converts the NRZI main signal into an NRZ main signal. The NRZI main signal is fed from the sync signal detection circuit 16.

A step PS2b following the step PS1b subjects only second ECC parity signals in the NRZ main signal to run length decoding (run length demodulation) to get the partial-decoding-resultant main signal. At the same time, the step PS2b converts the likelihood information fed from the sync signal detection circuit 16.

A step PS3b subsequent to the step PS2b subjects the partial-decoding-resultant main signal to error correction responsive to related second ECC parity signals contained therein, and thereby generates an error-corrected main signal. The second ECC parity signals correspond to inner code words and include, for example, turbo code signals or LDPC code signals. The error correction by the step PS3b corresponds to, for example, LDPC demodulation or turbo code demodulation.

A step PS4b following the step PS3b subjects the error-corrected main signal to run length decoding (run length demodulation) to get the full-decoding-resultant main signal. The full-decoding-resultant main signal is fed to the second ECC circuit 21. After the step PS4b, the current execution cycle of the program segment ends.

Sixth Embodiment

Figure 18:
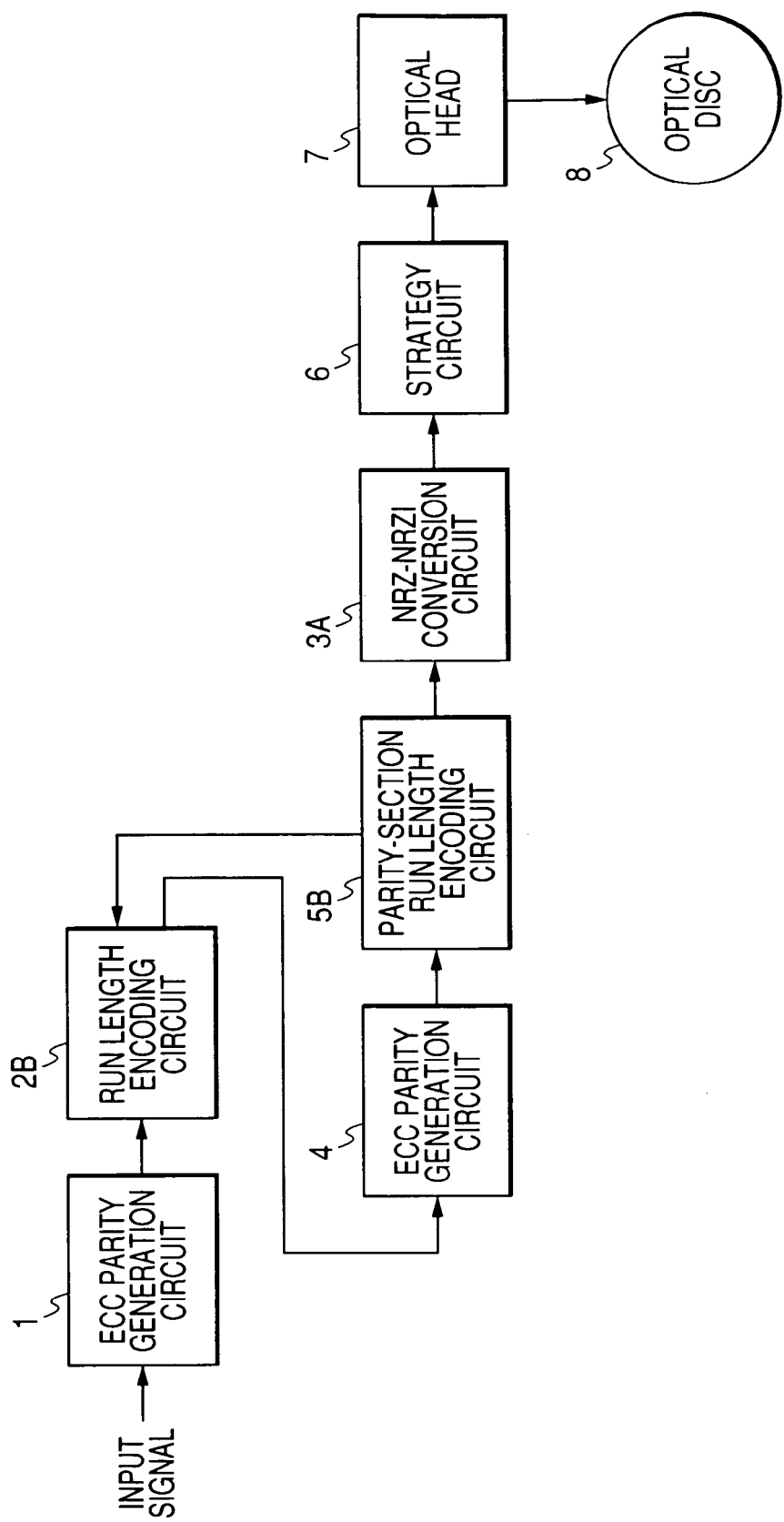
FIG. 18 is a block diagram of a recording apparatus according to a sixth embodiment of this invention.

FIG. 18 shows a recording apparatus according to a sixth embodiment of this invention. The recording apparatus of FIG. 18 is similar to that of FIG. 12 except for design changes described hereafter.

The recording apparatus of FIG. 18 includes a run length encoding circuit 2B and a parity-section run length encoding circuit 5B instead of the run length encoding circuit 2 and the parity-section run length encoding circuit 5 (see FIG. 12). The run length encoding circuit 2B is connected with the parity-section run length encoding circuit 5B.

The run length encoding circuit 2B receives the information code words from the first ECC parity generation circuit 1. In addition, the run length encoding circuit 2B receives a condition signal from the parity-section run length encoding circuit 5B which represents the result of the run length encoding by the parity-section run length encoding circuit 5B. The run length encoding circuit 2B implements the run length encoding (the run length modulation) of the received information code words in response to the received condition signal. Specifically, the run length encoding circuit 2B converts the information code words into a sequence of words of a run-length-limited code in response to the condition signal. The run length encoding circuit 2B holds the sequence of words of the run-length-limited code under DSV control. The conversion and the DSV control by the run length encoding circuit 2B are designed to match a finally recorded signal with the characteristics of a recording medium, that is, the optical disc 8. The run length encoding circuit 2B repetitively adds a sync signal of a fixed pattern to the sequence of words of the run-length-limited code. The run length encoding circuit 2B outputs the sync-added sequence of words of the run-length-limited code to the second ECC parity generation circuit 4.

The second ECC parity generation circuit 4 produces second ECC parity signals in response to the sync-added sequence of words of the run-length-limited code. The second ECC parity signals correspond to inner code words and include, for example, turbo code signals or LDPC code signals. The second ECC parity generation circuit 4 adds the second ECC parity signals to the sync-added sequence of words of the run-length-limited code to get information code words. The second ECC parity generation circuit 4 sequentially outputs the information code words to the parity-section run length encoding circuit 5B.

The parity-section run length encoding circuit 5B implements the run length encoding of only the second ECC parity signals in the information code words. Specifically, the parity-section run length encoding circuit 5B converts the second ECC parity signals into parity words of the run-length-limited code. The parity-section run length encoding circuit 5B holds an information bit stream inclusive of the parity words of the run-length-limited code under the DSV control. The conversion and the DSV control by the parity-section run length encoding circuit 5B are designed to match a finally recorded signal with the characteristics of a recording medium, that is, the optical disc 8. The parity-section run length encoding circuit 5B sequentially outputs the resultant code words to the NRZ-NRZI conversion circuit 3A. In addition, the parity-section run length encoding circuit 5B outputs a condition signal to the run length encoding circuit 2B which represents the result of the run length encoding by the parity-section run length encoding circuit 5B.

The run length encoding (the run length modulation) by the run length encoding circuit 2B is on a block-by-block basis. The run length encoding by the parity-section run length encoding circuit 5B is also on a block-by-block basis. The run length encoding of the current signal block (the current ECC block) by the run length encoding circuit 2B is responsive to the result of the run length encoding of the immediately-preceding signal block (the immediately-preceding ECC block) by the parity-section run length encoding circuit 5B. This design is intended to optimize state transitions in the run length modulation and maximize the effects of the DSV control.

The optical disc 8 has a land or lands. A land in a signal erased state (a crystallized state) totally reflects the laser light emitted from the optical head 7. The optical disc 8 is formed with pits during the recording of an information signal thereon. The pits represent the recorded information signal. The pits are disc portions in an amorphous state. The pits reflect the laser light at a lower rate. The optical head 7 applies the laser light to the optical disc 8, and receives a portion of the laser light reflected at and returned from the optical disc 8. The optical head 7 changes the received laser light into a corresponding electric signal through photoelectric conversion. It is preferable to decide the polarity of the electric signal originating from the laser light reflected at a pit and the polarity of the electric signal originating from the laser light reflected at a land, that is, the direction of the pit and the direction of the land. In this case, it is possible to prevent the occurrence of a polarity change which would adversely affect the LDPC decoding during the signal reproduction.

The first ECC parity generation circuit 1, the run length encoding circuit 2B, the second ECC parity generation circuit 4, and the parity-section run length encoding circuit 5B can be formed by a computer-based device having a combination of an input/output port, a processing unit, a ROM, and a RAM. The computer-based device operates in accordance with a control program stored in the ROM.

Figure 19:
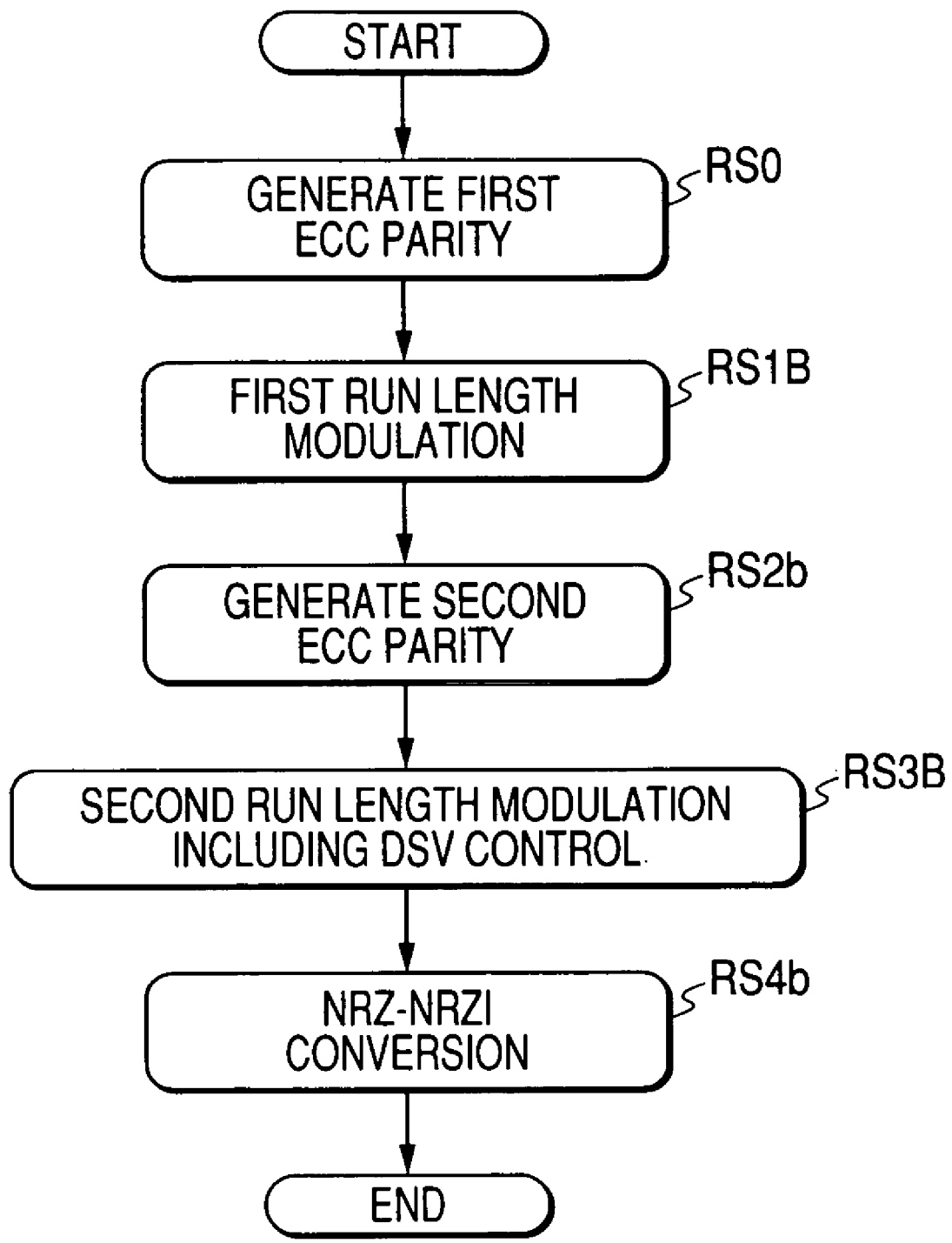
FIG. 19 is a general flowchart of a segment of a control program for a computer-based device in the sixth embodiment of this invention.

FIG. 19 is a general flowchart of a segment of the control program for the computer-based device. Preferably, the program segment is executed for every ECC block. Thus, in this case, the program segment is repetitively executed.

The program segment in FIG. 19 is similar to the program segment in FIG. 14 except that steps RS1B and RS3B replace the steps RS1 and RS3b respectively.

With reference to FIG. 19, the step RS1B retrieves a condition signal from the RAM. The retrieved condition signal represents the result of the run length encoding of the immediately-preceding ECC block by the step RS3B. Then, the step RS1B implements the run length encoding (the run length modulation) of the current ECC block of the information code words generated by the step RS0 in response to the result of the run length encoding of the immediately-preceding ECC block by the step RS3B. Specifically, the step RS1B converts the current ECC block of the information code words into a sequence of words of a prescribed run-length-limited code in response to the result of the run length encoding of the immediately-preceding ECC block by the step RS3B. The step RS1B holds the sequence of words of the run-length-limited code under DSV control. Preferably, the step RS1B adds a sync signal of a fixed pattern to the sequence of words of the run-length-limited code. As a result, the step RS1B generates a sync-added sequence of words of the run-length-limited code.

The step RS3B implements the run length encoding (the run length modulation) of only the second ECC parity signals in the information code words generated by the step RS2b. Specifically, the step RS3B converts the second ECC parity signals into parity words of the run-length-limited code. The step RS3B holds an information bit stream inclusive of the parity words of the run-length-limited code under the DSV control. The step RS3B generates an NRZ signal formed by a combination of the modulation-resultant second ECC parity signals and the non-modulated portions of the information code words. In addition, the step RS3B generates a condition signal representing the result of the run length encoding of only the second ECC parity signals in the current ECC block. The step RS3B stores the generated condition signal into the RAM for later use.

Seventh Embodiment

Figure 20:
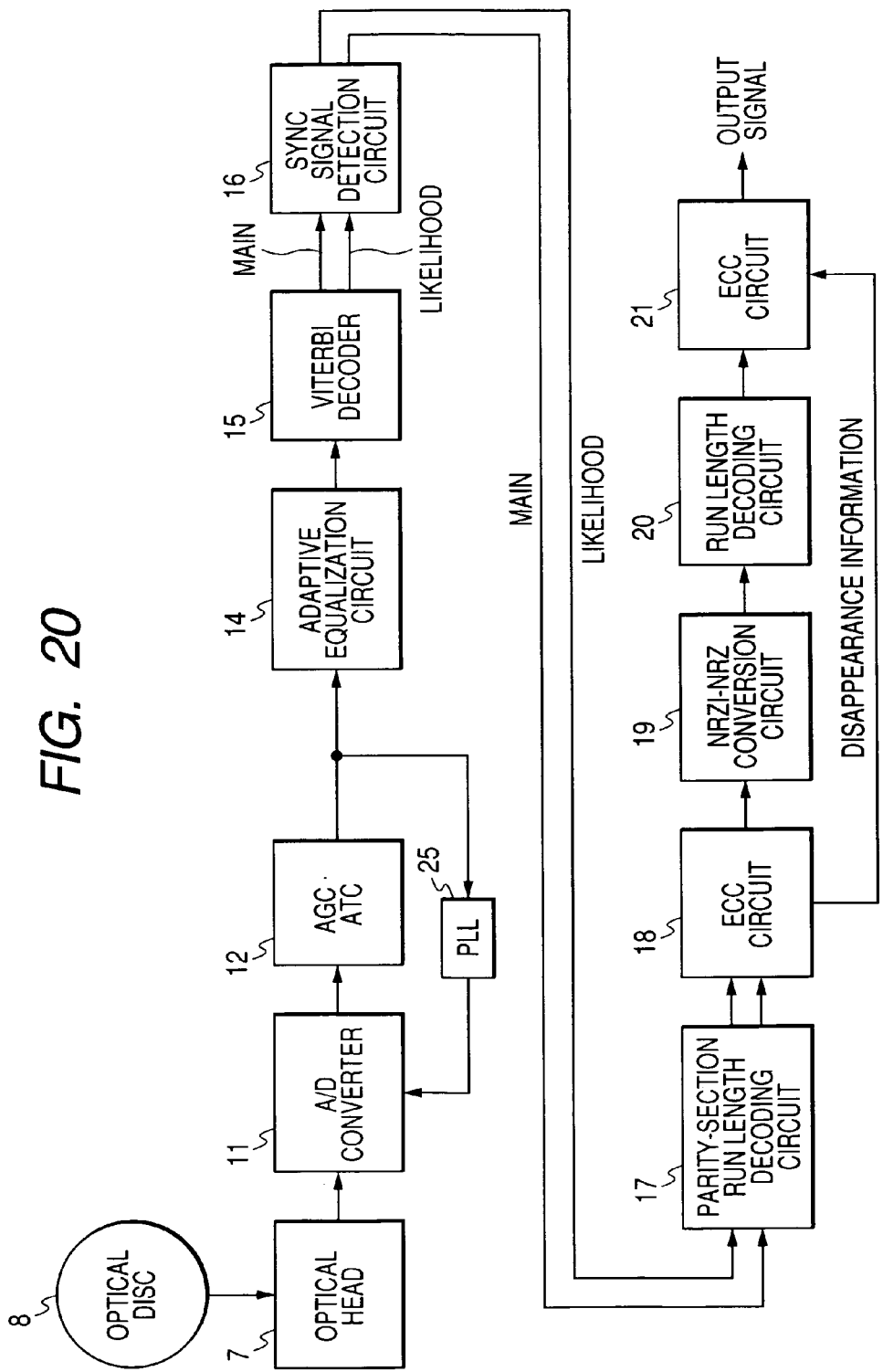
FIG. 20 is a block diagram of a reproducing apparatus according to a seventh embodiment of this invention.

FIG. 20 shows a reproducing apparatus according to a seventh embodiment of this invention. The reproducing apparatus of FIG. 20 is similar to that of FIG. 6 except for design changes described hereafter.

The reproducing apparatus of FIG. 20 includes a PLL (phase locked loop) circuit 25. The re-sampling DPLL 13 is omitted from the reproducing apparatus of FIG. 20, and the AGC and ATC circuit 12 and the adaptive equalization circuit 14 are directly connected.

The output signal of the AGC and ATC circuit 12 is fed to the adaptive equalization circuit 14 and the PLL circuit 25. The PLL circuit 25 recovers a system clock signal from the output signal of the AGC and ATC circuit 12. The PLL circuit 25 applies the system clock signal to the A/D converter 11. The A/D converter 11 implements signal sampling in response to the system clock signal.

The PLL circuit 25 includes a phase comparator, a loop filter, and a voltage-controlled oscillator (VCO). The phase comparator implements phase comparison between the output signal of the AGC and ATC circuit 12 and the output signal of the VCO, thereby generating a phase error signal. The phase comparator outputs the phase error signal to the loop filter. The loop filter subjects the phase error signal to a low-pass filtering process, thereby converting the phase error signal into a control voltage. The loop filter applies the control voltage to the VCO. The VCO oscillates at a frequency determined by the control voltage, and thereby generates the system clock signal. The generated system clock signal is locked in frequency and phase with respect to the output signal of the AGC and ATC circuit 12.

Eighth Embodiment

Figure 21:
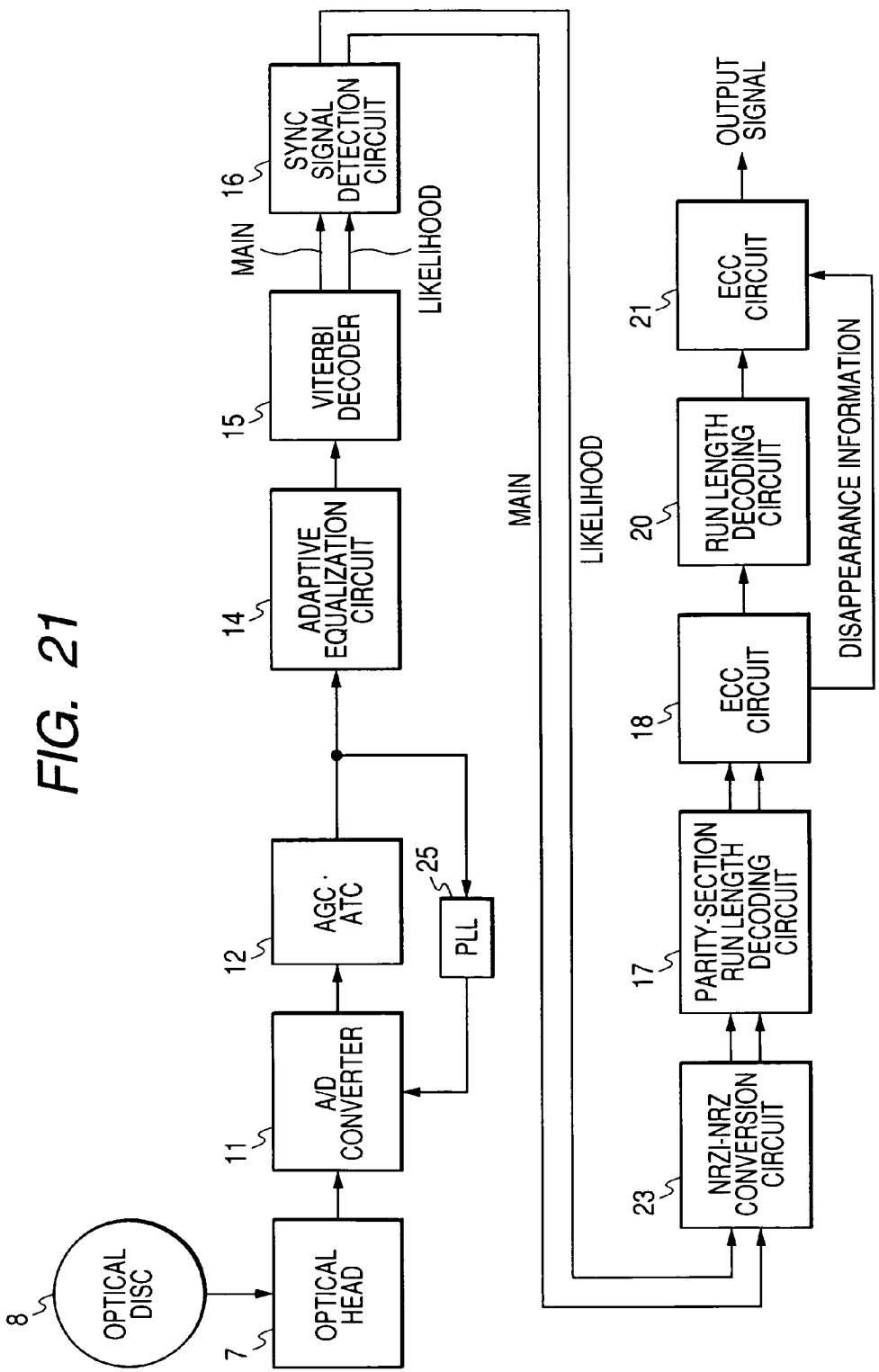
FIG. 21 is a block diagram of a reproducing apparatus according to an eighth embodiment of this invention.

FIG. 21 shows a reproducing apparatus according to an eighth embodiment of this invention. The reproducing apparatus of FIG. 21 is similar to that of FIG. 15 except for design changes described hereafter.

The reproducing apparatus of FIG. 21 includes a PLL (phase locked loop) circuit 25. The re-sampling DPLL 13 is omitted from the reproducing apparatus of FIG. 21, and the AGC and ATC circuit 12 and the adaptive equalization circuit 14 are directly connected.

The output signal of the AGC and ATC circuit 12 is fed to the adaptive equalization circuit 14 and the PLL circuit 25. The PLL circuit 25 recovers a system clock signal from the output signal of the AGC and ATC circuit 12. The PLL circuit 25 applies the system clock signal to the A/D converter 11. The A/D converter 11 implements signal sampling in response to the system clock signal.

The PLL circuit 25 includes a phase comparator, a loop filter, and a voltage-controlled oscillator (VCO). The phase comparator implements phase comparison between the output signal of the AGC and ATC circuit 12 and the output signal of the VCO, thereby generating a phase error signal. The phase comparator outputs the phase error signal to the loop filter. The loop filter subjects the phase error signal to a low-pass filtering process, thereby converting the phase error signal into a control voltage. The loop filter applies the control voltage to the VCO. The VCO oscillates at a frequency determined by the control voltage, and thereby generates the system clock signal. The generated system clock signal is locked in frequency and phase with respect to the output signal of the AGC and ATC circuit 12.

What is claimed is:

1. A recording apparatus comprising:
    a first run length encoder for implementing run length modulation of a first information signal to convert the first information signal into a second information signal of a prescribed run-length-limited code while subjecting the second information signal to DSV control and adding a sync signal to the second information signal to get a third information signal;
    a converter for converting the third information signal generated by the first run length encoder into an NRZI signal including information code words;
    a parity generator for generating original parity signals in response to the information code words in the NRZI signal according to a prescribed error correction scheme, and combining the information code words and the original parity signals to form a first parity-added signal;
    a second run length encoder for implementing run length modulation of only the original parity signals in the first parity-added signal to get modulated parity signals of the prescribed run-length-limited code, and thereby converting the first parity-added signal into a second parity-added signal inclusive of the information code words and the modulated parity signals while subjecting the second parity-added signal to DSV control; and
    means for recording the second parity-added signal generated by the second run length encoder on a recording medium.

2. A recording medium storing the second parity-added signal which has been recorded by the recording apparatus of claim 1.

3. A recording apparatus comprising:

a first run length encoder for implementing run length modulation of a first information signal to get a second information signal of a prescribed run-length-limited code;

a converter for converting the second information signal generated by the first run length encoder into an NRZI signal including information code words;

a parity generator for generating original parity signals in response to the information code words in the NRZI signal, and combining the information code words and the original parity signals to form a first parity-added signal;

a second run length encoder for implementing run length modulation of only the original parity signals in the first parity-added signal to get modulated parity signals of the prescribed run-length-limited code, and thereby converting the first parity-added signal into a second parity-added signal inclusive of the information code words and the modulated parity signals; and means for recording the second parity-added signal generated by the second run length encoder on a recording medium.

* * * * *